United States Patent
MacLaurin et al.

(10) Patent No.: US 11,593,864 B2
(45) Date of Patent: Feb. 28, 2023

(54) SHOPPING TRIP PLANNER

(71) Applicant: eBay Inc., San Jose, CA (US)

(72) Inventors: Matthew Bret MacLaurin, Santa Cruz, CA (US); James Ross Skorupski, San Jose, CA (US); Healey Cypher, Santa Cruz, CA (US); Flynn Joffray, Santa Cruz, CA (US); Hsin-Yi Chien, Cupertino, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 17/200,113

(22) Filed: Mar. 12, 2021

(65) Prior Publication Data
US 2021/0312530 A1 Oct. 7, 2021

Related U.S. Application Data

(63) Continuation of application No. 14/474,117, filed on Aug. 30, 2014, now Pat. No. 10,963,951.

(60) Provisional application No. 61/904,449, filed on Nov. 14, 2013.

(51) Int. Cl.
*G06Q 30/00* (2012.01)
*G06Q 30/0601* (2023.01)
*G06Q 10/087* (2023.01)

(52) U.S. Cl.
CPC ....... *G06Q 30/0639* (2013.01); *G06Q 10/087* (2013.01); *G06Q 30/0625* (2013.01); *G06Q 30/0635* (2013.01)

(58) Field of Classification Search
None
See application file for complete search history.

(56) References Cited

U.S. PATENT DOCUMENTS

| | | | |
|---|---|---|---|
| 5,948,040 | A | 9/1999 | Delorme et al. |
| 5,963,948 | A | 10/1999 | Shilcrat |

(Continued)

FOREIGN PATENT DOCUMENTS

| | | | |
|---|---|---|---|
| CN | 101025737 A | 8/2007 | |
| CN | 101213571 A | 7/2008 | |

(Continued)

OTHER PUBLICATIONS

Hicks, Dylan, SmartMart: IoT-based in-store mapping for mobile devices, Oct. 20, 2013, 9th IEEE International Conference on Collaborative Computing: Networking, Applications, and Worksharing (Year: 2013).*

(Continued)

*Primary Examiner* — Jeffrey A. Smith
*Assistant Examiner* — Timothy J Kang
(74) *Attorney, Agent, or Firm* — Schwegman Lundberg & Woessner, P.A.

(57) ABSTRACT

A system and method of an intelligent shopping infrastructure is provided. A data storage of current inventory from a plurality of merchants is maintained. User preferences that indicate an item affinity of a user are retrieved. Furthermore, a location of the user is detected. Using the detected location, available inventory, and item affinity, an available item from the current inventory of a merchant located within a predetermined distance to the location of the user that match the item affinity of the user is identified. The available item is presented on a user interface of a client device of the user.

20 Claims, 11 Drawing Sheets

(56) References Cited

U.S. PATENT DOCUMENTS

| | | |
|---|---|---|
| 6,026,375 A | 2/2000 | Hall et al. |
| 6,259,381 B1 | 7/2001 | Small |
| 6,263,278 B1 | 7/2001 | Nikiel et al. |
| 6,879,836 B2 | 4/2005 | Nakamoto et al. |
| 6,970,871 B1 | 11/2005 | Rayburn |
| 7,006,982 B2 | 2/2006 | Sorensen |
| 7,308,356 B2 | 12/2007 | Melaku et al. |
| 7,427,023 B2 | 9/2008 | Suenbuel |
| 7,600,034 B2 | 10/2009 | Nasu et al. |
| 7,698,062 B1 | 4/2010 | McMullen et al. |
| 7,756,757 B1 | 7/2010 | Oakes, III |
| 7,797,267 B2 | 9/2010 | Horvitz |
| 7,848,765 B2 | 12/2010 | Phillips et al. |
| 7,933,395 B1 | 4/2011 | Bailly et al. |
| 7,933,797 B2 | 4/2011 | Sorensen |
| 7,974,873 B2 | 7/2011 | Simmons et al. |
| 8,069,120 B2 | 11/2011 | Buehler et al. |
| 8,115,656 B2 | 2/2012 | Bevacqua et al. |
| 8,195,519 B2 | 6/2012 | Bonner et al. |
| 8,249,807 B1 | 8/2012 | Barbeau et al. |
| 8,295,854 B2 | 10/2012 | Osann, Jr. |
| 8,538,686 B2 | 9/2013 | Gruen et al. |
| 8,600,659 B1 | 12/2013 | Scherzinger |
| 8,615,359 B2 | 12/2013 | Alam et al. |
| 8,630,897 B1 | 1/2014 | Prada et al. |
| 8,700,316 B2 | 4/2014 | Su et al. |
| 8,738,292 B1 | 5/2014 | Faaborg et al. |
| 8,874,366 B2 | 10/2014 | Su et al. |
| 9,129,332 B1 | 9/2015 | Oakes, III |
| 9,141,987 B2 | 9/2015 | Perks et al. |
| 9,141,988 B2 | 9/2015 | Howard et al. |
| 9,171,327 B2 | 10/2015 | Nallu et al. |
| 9,547,812 B2 | 1/2017 | Oya |
| 9,547,872 B2 | 1/2017 | Howard et al. |
| 9,581,463 B2 | 2/2017 | Nallu et al. |
| 9,595,062 B2 * | 3/2017 | Goulert ................ H04W 4/021 |
| 9,679,325 B2 | 6/2017 | Nallu et al. |
| 9,852,460 B2 | 12/2017 | Howard et al. |
| 9,858,607 B2 | 1/2018 | Nallu et al. |
| 9,885,584 B2 | 2/2018 | Nallu et al. |
| 10,192,255 B2 | 1/2019 | Nallu et al. |
| 10,697,792 B2 | 6/2020 | Nallu et al. |
| 10,963,951 B2 | 3/2021 | Maclaurin et al. |
| 10,991,022 B2 | 4/2021 | Howard et al. |
| 11,054,276 B2 | 7/2021 | Nallu et al. |
| 2001/0047315 A1 | 11/2001 | Siegel |
| 2002/0010625 A1 | 1/2002 | Smith et al. |
| 2002/0026380 A1 | 2/2002 | Su |
| 2002/0130906 A1 | 9/2002 | Miyaki |
| 2002/0133411 A1 | 9/2002 | Nakamoto et al. |
| 2003/0229446 A1 | 12/2003 | Boscamp et al. |
| 2004/0011866 A1 | 1/2004 | Saad |
| 2004/0143386 A1 | 7/2004 | Yoshihara et al. |
| 2004/0245334 A1 * | 12/2004 | Sikorski ................ G06F 1/1694 235/383 |
| 2005/0097005 A1 | 5/2005 | Fargo |
| 2005/0154653 A1 | 7/2005 | Jongebloed |
| 2005/0171862 A1 | 8/2005 | Duncan |
| 2005/0177438 A1 | 8/2005 | Thomason et al. |
| 2006/0010037 A1 | 1/2006 | Angert et al. |
| 2006/0025923 A1 | 2/2006 | Dotan et al. |
| 2006/0058948 A1 | 3/2006 | Blass et al. |
| 2006/0074763 A1 | 4/2006 | Schmid |
| 2006/0227047 A1 | 10/2006 | Rosenberg |
| 2006/0287810 A1 | 12/2006 | Sadri et al. |
| 2007/0124066 A1 | 5/2007 | Kikuchi et al. |
| 2007/0150369 A1 | 6/2007 | Zivin |
| 2007/0174133 A1 | 7/2007 | Hearn et al. |
| 2007/0210938 A1 | 9/2007 | Deurwaarder et al. |
| 2007/0225902 A1 | 9/2007 | Gretton et al. |
| 2007/0226082 A1 | 9/2007 | Leal |
| 2008/0005055 A1 | 1/2008 | Horvitz |
| 2008/0033633 A1 | 2/2008 | Akiyoshi et al. |
| 2008/0082424 A1 | 4/2008 | Walton |
| 2008/0086323 A1 | 4/2008 | Petrie et al. |
| 2008/0086368 A1 | 4/2008 | Bauman et al. |
| 2008/0086509 A1 | 4/2008 | Wallace |
| 2008/0098090 A1 | 4/2008 | Geraci et al. |
| 2008/0126145 A1 | 5/2008 | Rackley et al. |
| 2008/0162032 A1 | 7/2008 | Wuersch et al. |
| 2008/0208446 A1 | 8/2008 | Geelen et al. |
| 2008/0248815 A1 | 10/2008 | Busch |
| 2008/0249870 A1 | 10/2008 | Angell et al. |
| 2008/0276186 A1 * | 11/2008 | Feduszczak ............ G06F 9/451 715/762 |
| 2008/0301102 A1 | 12/2008 | Liang |
| 2009/0006194 A1 | 1/2009 | Sridharan et al. |
| 2009/0043665 A1 | 2/2009 | Tirumalareddy et al. |
| 2009/0167553 A1 | 7/2009 | Hong et al. |
| 2009/0222438 A1 | 9/2009 | Strandell et al. |
| 2009/0240518 A1 | 9/2009 | Borom et al. |
| 2010/0027527 A1 | 2/2010 | Higgins et al. |
| 2010/0036807 A1 | 2/2010 | Lieske, Jr. et al. |
| 2010/0169336 A1 * | 7/2010 | Eckhoff-Hornback ...................... G06Q 20/203 707/758 |
| 2010/0179756 A1 | 7/2010 | Higgins et al. |
| 2010/0179885 A1 * | 7/2010 | Fiorentino ......... G06Q 30/0601 705/28 |
| 2010/0203901 A1 | 8/2010 | Dinoff et al. |
| 2010/0228574 A1 | 9/2010 | Mundinger et al. |
| 2010/0250673 A1 | 9/2010 | Laroia et al. |
| 2010/0286901 A1 | 11/2010 | Geelen et al. |
| 2010/0292921 A1 | 11/2010 | Zachariah et al. |
| 2010/0305984 A1 | 12/2010 | Ben et al. |
| 2011/0066364 A1 | 3/2011 | Hale |
| 2011/0090078 A1 | 4/2011 | Kim et al. |
| 2011/0112762 A1 | 5/2011 | Gruijters et al. |
| 2011/0125794 A1 | 5/2011 | Hutschemaekers |
| 2011/0130956 A1 | 6/2011 | Tracton et al. |
| 2011/0136480 A1 | 6/2011 | Osann, Jr. |
| 2011/0145092 A1 | 6/2011 | Paradise et al. |
| 2011/0145093 A1 | 6/2011 | Paradise et al. |
| 2011/0145096 A1 | 6/2011 | Jensen |
| 2011/0160996 A1 | 6/2011 | Terai et al. |
| 2011/0167058 A1 | 7/2011 | Van Os |
| 2011/0172909 A1 | 7/2011 | Kahn et al. |
| 2011/0177845 A1 | 7/2011 | Fasold |
| 2011/0179018 A1 | 7/2011 | Lazaridis et al. |
| 2011/0218933 A1 | 9/2011 | Hunsaker et al. |
| 2011/0231334 A1 | 9/2011 | Jindel |
| 2011/0313880 A1 | 12/2011 | Paul et al. |
| 2011/0320318 A1 | 12/2011 | Patel et al. |
| 2012/0004841 A1 | 1/2012 | Schunder |
| 2012/0023034 A1 | 1/2012 | Lynch et al. |
| 2012/0036014 A1 | 2/2012 | Sunkada |
| 2012/0084177 A1 | 4/2012 | Tanaka et al. |
| 2012/0101818 A1 | 4/2012 | Scott et al. |
| 2012/0116922 A1 | 5/2012 | Ku |
| 2012/0123673 A1 | 5/2012 | Perks et al. |
| 2012/0126998 A1 | 5/2012 | Morgan et al. |
| 2012/0130865 A1 | 5/2012 | Rendler |
| 2012/0143489 A1 | 6/2012 | Lee et al. |
| 2012/0209749 A1 | 8/2012 | Hammad et al. |
| 2012/0239504 A1 * | 9/2012 | Curlander ............ G06Q 30/02 705/14.66 |
| 2012/0253656 A1 | 10/2012 | Brandt |
| 2012/0253660 A1 | 10/2012 | Dillahunt et al. |
| 2012/0276928 A1 | 11/2012 | Shutter |
| 2012/0290383 A1 | 11/2012 | Busch |
| 2012/0299707 A1 | 11/2012 | Centanni et al. |
| 2012/0302258 A1 | 11/2012 | Pai et al. |
| 2012/0310527 A1 | 12/2012 | Yariv et al. |
| 2012/0316989 A1 | 12/2012 | Wong et al. |
| 2012/0323692 A1 | 12/2012 | Shutter |
| 2013/0036117 A1 | 2/2013 | Fisher et al. |
| 2013/0054135 A1 | 2/2013 | Backsen, Jr. |
| 2013/0082874 A1 | 4/2013 | Zhang |
| 2013/0085889 A1 | 4/2013 | Fitting et al. |
| 2013/0097246 A1 | 4/2013 | Zifroni et al. |
| 2013/0185150 A1 | 7/2013 | Crum |
| 2013/0198030 A1 | 8/2013 | Linden et al. |
| 2013/0198031 A1 | 8/2013 | Mitchell et al. |
| 2013/0218463 A1 | 8/2013 | Howard et al. |

(56) References Cited

U.S. PATENT DOCUMENTS

| | | | |
|---|---|---|---|
| 2013/0218912 | A1 | 8/2013 | Howard et al. |
| 2013/0226731 | A1 | 8/2013 | Macneille et al. |
| 2013/0253832 | A1 | 9/2013 | Nallu et al. |
| 2013/0254304 | A1 | 9/2013 | Van et al. |
| 2013/0282533 | A1 | 10/2013 | Foran et al. |
| 2013/0290106 | A1* | 10/2013 | Bradley .............. G06Q 90/20 705/323 |
| 2013/0325667 | A1 | 12/2013 | Satyavolu et al. |
| 2014/0058886 | A1 | 2/2014 | Gopalkrishnan |
| 2014/0074743 | A1 | 3/2014 | Rademaker |
| 2014/0156410 | A1 | 6/2014 | Wuersch et al. |
| 2014/0172571 | A1 | 6/2014 | Fabrikant et al. |
| 2014/0188658 | A1 | 7/2014 | Li et al. |
| 2014/0207611 | A1 | 7/2014 | Cleary et al. |
| 2014/0336925 | A1 | 11/2014 | Akin |
| 2014/0358724 | A1 | 12/2014 | Nallu et al. |
| 2014/0365341 | A1* | 12/2014 | MacLaurin ............ G06F 3/048 705/26.81 |
| 2015/0039393 | A1 | 2/2015 | Jain |
| 2015/0066649 | A1 | 3/2015 | Kumar et al. |
| 2015/0073941 | A1 | 3/2015 | Burrows et al. |
| 2015/0134488 | A1 | 5/2015 | Maclaurin et al. |
| 2015/0294396 | A1* | 10/2015 | Goodwin .......... G06Q 30/0639 705/26.9 |
| 2015/0330806 | A1 | 11/2015 | Nallu et al. |
| 2016/0003637 | A1 | 1/2016 | Andersen |
| 2016/0012509 | A1 | 1/2016 | Howard et al. |
| 2016/0041000 | A1 | 2/2016 | Nallu et al. |
| 2016/0202073 | A1 | 7/2016 | Claycomb et al. |
| 2017/0122746 | A1 | 5/2017 | Howard et al. |
| 2017/0131113 | A1 | 5/2017 | Nallu et al. |
| 2018/0075509 | A1 | 3/2018 | Howard et al. |
| 2018/0106638 | A1 | 4/2018 | Nallu et al. |
| 2018/0150893 | A1 | 5/2018 | Nallu et al. |
| 2020/0264008 | A1 | 8/2020 | Nallu et al. |
| 2021/0318137 | A1 | 10/2021 | Nallu et al. |

FOREIGN PATENT DOCUMENTS

| | | |
|---|---|---|
| CN | 101308029 A | 11/2008 |
| CN | 101743455 A | 6/2010 |
| CN | 102024041 A | 4/2011 |
| CN | 102037324 A | 4/2011 |
| CN | 102147838 A | 8/2011 |
| EP | 0510172 B1 | 7/1995 |
| EP | 1991827 A2 | 11/2008 |
| EP | 1991974 A2 | 11/2008 |
| EP | 2383688 A1 | 11/2011 |
| JP | H11-332775 A | 12/1999 |
| JP | 2010054389 A | 3/2010 |
| KR | 1020050009092 A | 1/2005 |
| KR | 1020070093135 A | 9/2007 |
| KR | 1020090016101 A | 2/2009 |
| KR | 1020110012122 A | 2/2011 |
| KR | 10-2011-0111262 A | 10/2011 |
| KR | 1020110134938 A | 12/2011 |
| KR | 1020130116091 A | 10/2013 |
| WO | 2012135143 A2 | 10/2012 |
| WO | 2013/095440 A1 | 6/2013 |
| WO | 2013/126763 A1 | 8/2013 |
| WO | 2014/085657 A1 | 6/2014 |
| WO | 2013126763 A1 | 6/2014 |
| WO | 2015/073567 A1 | 5/2015 |

OTHER PUBLICATIONS

Office Action Received for Canadian Patent Application No. 2,929,782, dated Aug. 2, 2021, 7 pages.
Office Action received for Chinese Patent Application No. 201810242824.8 dated Jul. 6, 2021, 12 pages(2 Pages of English Translation & 10 Pages of Official Copy).
Office Action received for Chinese Patent Application No. 201810243819.9 dated Jun. 29, 2021, 9 Pages(1 Page of English Translation & 8 Pages of Official copy).
International Preliminary Report on Patentability received for PCT Application No. PCT/US2013/072339, dated Jun. 11, 2015, 7 pages.
International Search Report received for PCT Application No. PCT/US2013/072339, dated Apr. 28, 2014, 5 pages.
Written Opinion received for PCT Application No. PCT/US2013/072339, dated Apr. 28, 2014, 5 pages.
International Preliminary Report on Patentability received for PCT Application No. PCT/US2014/065279, dated May 26, 2016, 9 pages.
International Search Report received for PCT Patent Application No. PCT/US2014/065279, dated Feb. 18, 2015, 2 pages.
Final Office Action received for U.S. Appl. No. 14/809,543, dated Jun. 6, 2017, 15 pages.
Final Office Action received for U.S. Appl. No. 14/809,543, dated Nov. 17, 2016, 15 pages.
Non-Final Office Action received for U.S. Appl. No. 14/809,543, dated Apr. 12, 2016, 14 pages.
Non-Final Office Action received for U.S. Appl. No. 14/809,543, dated Feb. 16, 2017, 16 pages.
Notice of Allowance received for U.S. Appl. No. 14/809,543, dated Aug. 24, 2017, 5 pages.
Final Office Action received for U.S. Appl. No. 14/859,601, dated May 16, 2017, 12 pages.
First Action Interview—Office Action Summary received for U.S. Appl. No. 14/859,601, dated Jan. 31, 2017, 6 pages.
First Action Interview—Pre-interview Communication received for U.S. Appl. No. 14/859,601, dated Oct. 14, 2016, 3 pages.
Notice of Allowance received for U.S. Appl. No. 14/859,601, dated Aug. 17, 2017, 8 pages.
Final Office Action received for U.S. Appl. No. 14/922,327, dated Jun. 29, 2016, 14 pages.
Non-Final Office Action received for U.S. Appl. No. 14/922,327, dated Feb. 1, 2016, 13 pages.
Notice of Allowance received for U.S. Appl. No. 14/922,327, dated Oct. 13, 2016, 5 pages.
Final Office Action received for U.S. Appl. No. 15/406,283, dated Jul. 3, 2019, 16 pages.
Non-Final Office Action received for U.S. Appl. No. 15/406,283, dated Feb. 28, 2019, 14 pages.
Non-Final Office Action Received for U.S. Appl. No. 15/406,283, dated Sep. 12, 2019, 17 pages.
Non-Final Office Action received for U.S. Appl. No. 15/414,772, dated Apr. 20, 2017, 7 pages.
Notice of Allowance received for U.S. Appl. No. 15/414,772, dated Sep. 28, 2017, 5 pages.
Advisory Action Received for U.S. Appl. No. 15/815,358, dated Sep. 8, 2020, 2 pages.
Final Office Action Received for U.S. Appl. No. 15/815,358, dated Jul. 9, 2020, 7 pages.
Non Final Office Action Received for U.S. Appl. No. 15/815,358, dated Feb. 21, 2020, 12 pages.
Written Opinion received for PCT Patent Application No. PCT/US2014/065279, dated Feb. 18, 2015, 7 pages.
Woodward,"Gap will try a variation of order on line and pick up in store", Digital Commerce 360, https://www.digitalcommerce360.com/2013/04/19/gap-will-try-variation-order-online-and-pick-store, Apr. 19, 2013, 7 pages.
Notice of Allowance received for U.S. Appl. No. 15/846,995, dated Feb. 6, 2020, 8 pages.
Office Action received for Canadian Patent Application No. 2,861,822, dated May 22, 2015, 5 pages.
Office Action Received for Canadian Patent Application No. 2,861,822, dated Dec. 23, 2019, 5 pages.
Office Action received for Canadian Patent Application No. 2,861,822, dated Apr. 20, 2017, 3 pages.
First Examiner Report received for Australian Patent Application No. 2016202371, dated Jun. 29, 2017, 4 pages.
First Examiner Report received for Australian Patent Application No. 2014348748, dated Nov. 12, 2016, 3 pages.
Office Action received for Canadian Patent Application No. 2,861,822, dated May 31, 2016, 5 pages.

(56) References Cited

OTHER PUBLICATIONS

Office Action received for Canadian Patent Application No. 2,861,822, dated Nov. 30, 2018, 4 pages.
Office Action received for Chinese Patent Application No. 201380010168.4, dated Oct. 17, 2016, 19 pages.
Office Action received for Canadian Patent Application No. 2,893,135, dated Aug. 11, 2016, 3 pages.
Office Action received for Canadian Patent Application No. 2,929,782, dated Feb. 21, 2017, 5 pages.
Office Action received for Canadian Patent Application No. 2,929,782, dated Jan. 31, 2018, 5 pages.
Office Action received for Canadian Patent Application No. 2,929,782, dated Oct. 24, 2018, 6 pages.
Office Action received for Canadian Patent Application No. 2,929,782, dated Sep. 14, 2020, 10 pages.
Office Action Received for Canadian Patent Application No. 2,929,782, dated Aug. 1, 2019, 7 pages.
First Examiner Report received for Australian Patent Application No. 2013222225, dated Apr. 14, 2015, 3 pages.
Second Examiner Report received for Australian Patent Application No. 2013222225, dated Nov. 3, 2015, 3 pages.
First Examiner Report received for Australian Patent Application No. 2013352130, dated Mar. 11, 2016, 5 pages.
Second Examiner Report received for Australian Patent Application No. 2013352130, dated Sep. 23, 2016, 4 pages.
Office Action received for Chinese Patent Application No. 201380010168.4, dated Jun. 30, 2017, 25 pages.
Second Examiner Report received for Australian Patent Application No. 2016202371, dated Sep. 25, 2017, 4 pages.
Wondering how TSO Mobile and GPS Tracking Benefit Passengers and The Public Transportation Industry?, Retrieved from the Internet: URL: http://www.tsomobile.com/TSO-Public-Transportation.html, Jul. 24, 2013, 2 pages.
Final Office Action received for Korean Patent Application No. 10-2014-7026159, dated Dec. 28, 2016, 5 pages (2 pages of English Translation and 3 pages of Official Copy).
Office Action received for Korean Patent Application No. 10-2014-7026159, dated Apr. 28, 2017, 5 pages (2 pages of English Translation and 3 pages of Official Copy).
Office Action received for Korean Patent Application No. 10-2014-7026159, dated May 27, 2016, 10 pages (4 pages of English Translation and 6 pages of Official Copy).
Office Action received for Korean Patent Application No. 10-2014-7026159, dated Oct. 19, 2015, 8 pages (3 pages of English Translation and 5 pages of Official Copy).
Office Action received for Korean Patent Application No. 10-2016-7015678, dated Apr. 9, 2018, 7 pages.
Dennis,"Google Maps with hotel pricing—Google says what is the fuss?", Google map,PhocusWire, Jun. 16, 2010, 9 pages.
Office Action received for Korean Patent Application No. 10-2016-7015678, dated Jun. 16, 2017, 7 pages (5 pages of English Translation and 2 pages of Official Copy).
Office Action received for Korean Patent Application No. 10-2016-7015678, dated Nov. 4, 2016, 14 pages (6 pages of English Translation and 8 pages of Official Copy).
Final Office Action received for Korean Patent Application No. 10-2018-7016579, dated Mar. 29, 2019, 7 pages (3 pages of English Translation and 4 pages of Official Copy).
Office Action Received for Korean Patent Application No. 10-2018-7016579, dated Jan. 31, 2020, 8 pages (6 pages of Official Copy and 2 pages of English Translation).
Office Action received for Korean patent Application No. 10-2018-7016579, dated Jul. 3, 2019, 14 pages (7 pages of English Translation and 7 pages of Official copy).
Office Action received for Korean Patent Application No. 10-2018-7016579, dated Sep. 11, 2018, 15 pages (7 pages of English Translation and 8 pages of Official Copy).

GOOGLE PLAY,"Moovit-Real-time Transit Info—Android Apps on Google Play", Retrieved from the Internet: <URL: https://play.google.com/store/apps/details?id=com .tranzmate&hl=en>, Accessed on Aug. 2, 2017, 2 pages.
Non-Final Office Action received for U.S. Appl. No. 13/691,291, dated Dec. 23, 2014, 13 pages.
Notice of Allowance received for U.S. Appl. No. 13/691,291, dated Jun. 24, 2015, 11 pages.
Final Office Action received for U.S. Appl. No. 13/691,390, dated Nov. 6, 2015, 15 pages.
Non-Final Office Action received for U.S. Appl. No. 13/691,390, dated Jul. 10, 2015, 13 pages.
Non-Final Office Action received for U.S. Appl. No. 13/691,390, dated Jun. 9, 2016, 21 pages.
Restriction Requirement received for U.S. Appl. No. 13/691,390, dated Feb. 26, 2015, 9 pages.
Non-Final Office Action received for U.S. Appl. No. 13/725,669, dated Dec. 12, 2014, 10 pages.
Non-Final Office Action received for U.S. Appl. No. 13/725,669, dated Jun. 26, 2014, 9 pages.
Notice of Allowance received for U.S. Appl. No. 13/725,669, dated May 13, 2015, 9 pages.
Corrected Notice of Allowability received for U.S. Appl. No. 13/725,766, dated Dec. 13, 2016, 2 pages.
Final Office Action received for U.S. Appl. No. 13/725,766, dated Apr. 1, 2015, 24 pages.
Final Office Action received for U.S. Appl. No. 13/725,766, dated May 3, 2016, 23 pages.
Non-Final Office Action received for U.S. Appl. No. 13/725,766, dated Nov. 20, 2014, 21 pages.
Non-Final Office Action received for U.S. Appl. No. 13/725,766, dated Oct. 29, 2015, 21 pages.
Notice of Allowance received for U.S. Appl. No. 13/725,766, dated Aug. 31, 2016, 9 pages.
Decision on Pre-Appeal Brief Request received for U.S. Appl. No. 13/890,631, dated Nov. 17, 2015, 2 pages.
Final Office Action received for U.S. Appl. No. 13/890,631, dated Aug. 13, 2015, 9 pages.
Final Office Action received for U.S. Appl. No. 13/890,631, dated Sep. 22, 2016, 9 pages.
Non-Final Office Action received for U.S. Appl. No. 13/890,631, dated Dec. 18, 2014, 9 pages.
Non-Final Office Action received for U.S. Appl. No. 13/890,631, dated Feb. 25, 2016, 8 pages.
Pre-Appeal Brief Request filed on Oct. 13, 2015, for U.S. Appl. No. 13/890,631, 5 pages.
Final Office Action received for U.S. Appl. No. 13/957,745, dated Jan. 4, 2016, 18 pages.
Non-Final Office Action received for U.S. Appl. No. 13/957,745, dated Jun. 11, 2015, 17 pages.
Non-Final Office Action received for U.S. Appl. No. 14/369,991, dated Dec. 23, 2014, 13 pages.
Non-Final Office Action received for U.S. Appl. No. 14/369,991, dated Jul. 18, 2016, 16 pages.
Non-Final Office Action received for U.S. Appl. No. 14/369,991, dated Sep. 22, 2015, 14 pages.
Notice of Allowance received for U.S. Appl. No. 14/369,991, dated Apr. 27, 2015, 8 pages.
Notice of Allowance received for U.S. Appl. No. 14/369,991, dated Feb. 17, 2016, 5 pages.
Notice of Allowance received for U.S. Appl. No. 14/369,991, dated Oct. 24, 2016, 5 pages.
Frier,"Facebook Working on Location-Based Mobile-Ad Product", Retrieved from the Internet URL: <http://www.bloomberg.com/news/2012-06-18/facebook-readying-location-based-mobile-ad-product.html>, Jun. 19, 2012, 2 pages.
http://shoptrotter.com,"I'm the ShopTrotter! —Shopping can be fun, I promise!", Retrieved from the Internet URL: <https://shoptrotter.com/>, Mar. 25, 2020, 15 pages.
Owen,"The power of where: using IP geolocation to create instant local connections online", Sep. 25, 2012, 7 pages.
International Search Report received for PCT Application No. PCT/US2013/027415, dated May 3, 2013, 2 pages.

(56) References Cited

OTHER PUBLICATIONS

International Preliminary Report on Patentability received for PCT Application No. PCT/US2013/027415, dated Sep. 4, 2014, 8 pages.
International Written Opinion received for PCT Application No. PCT/US2013/027415, dated May 3, 2013, 6 pages.
Office Action Received for Canadian Patent Application No. 2,861,822, dated Oct. 19, 2020, 4 pages.
Notice of Allowance Received for U.S. Appl. No. 16/868,239, dated Mar. 8, 2021, 5 pages.
Non Final Office Action Received for U.S. Appl. No. 16/868,239, dated Nov. 12, 2020, 7 pages.
Notice of Allowance received for U.S. Appl. No. 15/820,994, dated Sep. 17, 2018, 8 pages.
Notice of Allowance received for U.S. Appl. No. 15/815,358, dated Jan. 13, 2021, 8 Pages.
Notice of Allowance received for U.S. Appl. No. 14/474,117, dated Nov. 27, 2020, 15 pages.
Non-Final Office Action received for U.S. Appl. No. 14/474,117, dated Oct. 2, 2018, 23 pages.
Non-Final Office Action received for U.S. Appl. No. 14/474,117, dated Jun. 26, 2017, 25 pages.
Non-Final Office Action received for U.S. Appl. No. 14/474,117, dated Jun. 16, 2015, 19 pages.
Non-Final Office Action received for U.S. Appl. No. 14/474,117, dated Dec. 19, 2016, 26 pages.
Non Final Office Action Received for U.S. Appl. No. 14/474,117, dated Jan. 8, 2020, 25 Pages.
Final Office Action Received for U.S. Appl. No. 14/474,117, dated Jul. 10, 2020, 28 Pages.
Final Office Action received for U.S. Appl. No. 14/474,117, dated Apr. 15, 2019, 24 pages.
Final Office Action received for U.S. Appl. No. 14/474,117, dated Feb. 9, 2018, 28 pages.
Final Office Action received for U.S. Appl. No. 14/474,117, dated Dec. 4, 2015, 23 pages.
Office Action Received for Korean Patent Application No. 10-2021-7001052, dated Feb. 25, 2021, 8 Pages (4 Pages of English Translation and 4 pages of Official Copy).
Office Action received for Korean Patent Application No. 10-2016-7015678, dated Dec. 28, 2017, 6 pages (3 pages of English Translation and 3 pages of Official Copy).
"TSO Mobile & Public Transportation: Tracking, Management and Logistic Solutions", http://www.tsomobile.com/tso-mobile-public-transportation/, Aug. 25, 2014, 4 pages.
Office Action received for Korean Patent Application No. 10-2021-7043025, dated Jan. 25, 2022, 15 pages (8 pages of English translation and 7 pages of official copy).
Office Action received for Chinese Patent Application No. 201810242611.5, dated Oct. 9, 2021, 11 pages (2 pages of English translation & 9 pages of official copy).
Office Action received for Chinese Patent Application No. 201810243819.9, mailed on Nov. 10, 2021, 8 p. 2 p. of English translation & 6 p. of official copy).

* cited by examiner

SHOPPING TRIP PLANNER

CROSS REFERENCE TO RELATED APPLICATION

This application is a Continuation of and claims the benefit of priority to U.S. application Ser. No. 14/474,117, filed Aug. 30, 2014, which claims the benefit of priority to U.S. Provisional Patent Application Ser. No. 61/904,449 filed Nov. 14, 2013, each of which is hereby incorporated by reference in its entirety.

FIELD

The present disclosure relates generally to data analysis and, in a specific example embodiment, to providing an intelligent shopping infrastructure.

BACKGROUND

Typically, when a user wants items from more than one merchant, the user has to shop each of the merchants individually, maintain separate shopping carts that are processed separately, and arrange to pick up from each location of the merchants or have the items delivered in a plurality of packages. Additionally, the user may be hesitant to complete a transaction if the user cannot see, feel, or try on certain items. This leads to the user abandoning a shopping session or a shopping cart that has items in it.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for providing an intelligent shopping infrastructure. The intelligent shopping infrastructure takes advantage of a user device that allows transmission of information to and from a user interface of the user device with a networked system that can monitor user preferences and affinities, detect user location, maintain merchant inventory, and trigger transactions between the user and one or more merchants. In example embodiments, a data storage of current inventory from a plurality of merchants affiliated with a marketplace system is maintained. User preferences that indicate an item affinity of a user (e.g., brands, merchants, types of items) are accessed and retrieved. Additionally, a location of the user is detected. Using the detected location, available inventory, and item affinity, an available item from the current inventory of a merchant located within a predetermined distance to the location of the user that match the item affinity of the user is identified. The available item is presented on a user interface of a client device of the user.

Figure 1:
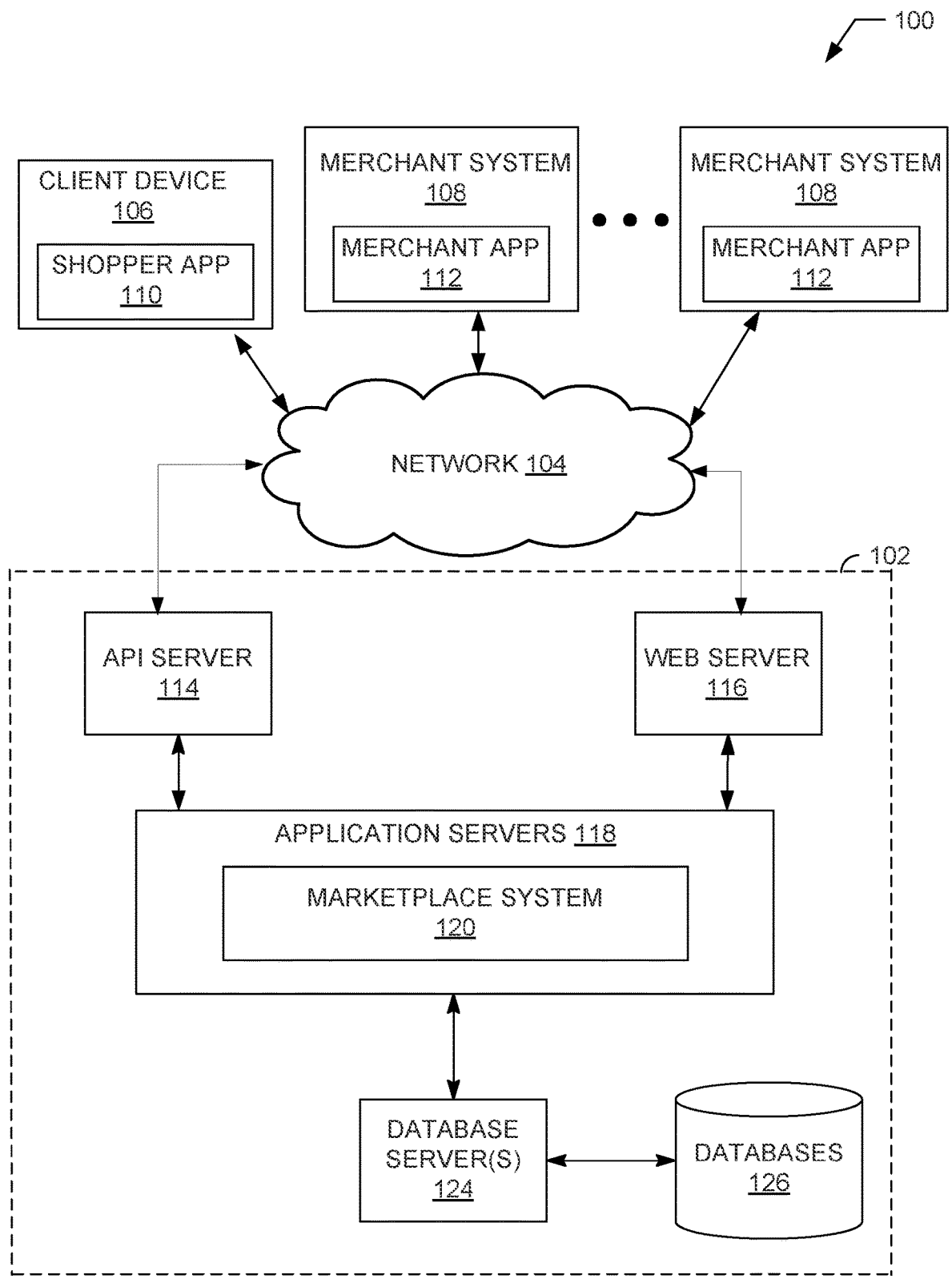
FIG. 1 is a block diagram illustrating an example embodiment of a network architecture of a system used to provide an instant stylist.

With reference to FIG. 1, an example embodiment of a high-level client-server-based network architecture 100 to provide the intelligent shopping infrastructure is shown. A networked system 102, in an example form of a network-server-side functionality, is coupled via a communication network 104 (e.g., the Internet, wireless network, cellular network, or a Wide Area Network (WAN)) to a client device 106. The networked system 102 is also coupled via the communication network 104 to a plurality of merchant systems 108.

The client device 106 may comprise a mobile phone, desktop computer, laptop, or any other communication device that a user may utilize to access the networked system 102. In some embodiments, the client device 106 may comprise a display module (not shown) to display information (e.g., in the form of user interfaces). In further embodiments, the client device 106 may comprise one or more of a touch screen, accelerometer, camera, microphone, and Global Positioning System (GPS) device. The client device 106 may be a device of a user, which is used to search or browse for information (e.g., publications, news items, products for sale), provide user inputs, and receive results from the networked system 102. In one embodiment, the networked system 102 includes or is linked to a network-based marketplace that manages digital goods, publishes publications comprising product listings of products or items available on the network-based marketplace, and manages payments for these marketplace transactions.

FIG. 1 illustrates, for example, the client device 106 having a shopper application 110 executing thereon. The shopper application 110 enables the user device 106 to interface with the networked system 102 in order to search for, locate (e.g., on a map), purchase, or hold items of interest for the user. Accordingly, the shopper application 110 provides a plurality of user interfaces that allow the user to perform searches, receive results, receive recommendations and promotions, view maps or locations of items or merchants, place orders, place items on hold, or return items.

In a further embodiment, the networked system 102 may also be linked to a plurality of merchants via their respective merchant systems 108. Each of the merchant systems 108 may comprise a merchant application 112. The merchant application 112 may provide information (e.g., inventory, sales, promotions, purchases made by users) to the networked system 102, which may be shared by the networked system 102 with a user of the client device 106 via the shopper application 110. Additionally, the merchant application 112 may receive information (e.g., user shopping preferences, orders, item holds, recommendations for users) from the networked system 102.

An Application Program Interface (API) server 114 and a web server 116 are coupled to, and provide programmatic and web interfaces respectively to, one or more application servers 118. The application servers 118 host a marketplace system 120, which may comprise one or more modules, applications, or engines, each of which may be embodied as hardware, software, firmware, or any combination thereof. The application servers 118 are, in turn, coupled to one or more database servers 124 facilitating access to one or more information storage repositories, data stores, or databases 126. In one embodiment, the databases 126 are storage devices that store merchant data (e.g., inventory, location, promotions, sales), user data (e.g., profile, preferences, past shopping history, past browsing history), and transaction data (e.g., orders, item holds).

The marketplace system 120 provides an intelligent shopping infrastructure that leverages user location, preferences, and affinities (e.g., past transactions, past browsing history) with merchant information (e.g., current inventory, promotions) to facilitate a transaction. In example embodiments, the marketplace system 120 receives search parameters, performs searches for the items based on the search parameters, process orders and holds for items, manages delivery and returns, and provides recommendations based on location, affinities, and past histories, among other operations. The marketplace system 120 will be discussed in more detail in connection with FIG. 2 below.

Figure 2:
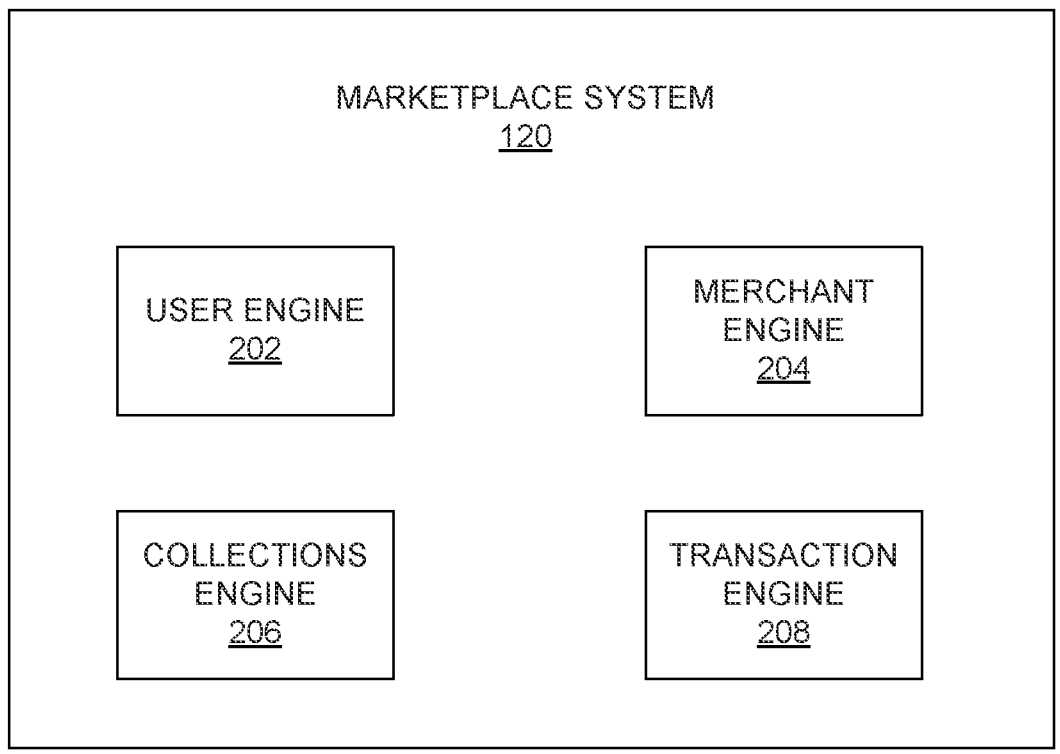
FIG. 2 is a block diagram illustrating an example embodiment of a marketplace system.

Referring now to FIG. 2, an example block diagram illustrating multiple components that, in one embodiment, are provided within the marketplace system 120 is shown. The marketplace system 120 performs operations that provide an intelligent shopping infrastructure. To enable these operations, the marketplace system 120 comprises a user engine 202, a merchant engine 204, a collections engine 206, and a transaction engine 208. The multiple components themselves are communicatively coupled (e.g., via appropriate interfaces), either directly or indirectly, to each other and to various data sources (e.g., the databases 126), to allow information to be passed between the components or to allow the components to share and access common data. Thus, the marketplace system 120 is coupled to, and exchanges information with, the databases 126.

The user engine 202 manages operations with respect to users (e.g., consumers) of the marketplace system 120. In example embodiments, the user engine 202 monitors actions performed by the user via, for example, the shopper application 110 on their user device 106. The actions may include browses and searches, purchases made, items saved to a wishlist or watchlist, and items saved to a cart but not purchased. The user engine 202 may also track a user's location via their client device 106. The user engine 202 will be discussed in more detail in connection with FIG. 3 below.

The merchant engine 204 manages operations with respect to merchants that are affiliated with the marketplace system 120. In example embodiments, merchants exchange information with the marketplace system 120 in order to facilitate transactions with users. Accordingly, the merchant may transmit location and inventory information to the marketplace system 120 while receiving order and hold notifications as well as consumer upsell information. The merchant engine 204 will be discussed in more detail in connection with FIG. 4 below.

The collections engine 206 manages item collections at the marketplace system 120. An item collection may comprise a plurality of items that are compatible and may be ideal to be purchased together (e.g., in order to complete a project or for a particular look/style). The collections engine 206 will be discussed in more detail in connection with FIG. 5 below.

The transaction engine 208 manages transactions initiated with the marketplace system 120. Accordingly, the transaction engine 208 may process an order (e.g., collect payment and confirm delivery), and cause the merchant engine 204 to provide notification and to one or more merchants regarding the order (e.g., package and deliver items, hold items) along with managing payment to the one or more merchants. The transaction engine also provides transaction information to the user engine 202 to update preferences of the user (e.g., update purchase history).

Figure 3:
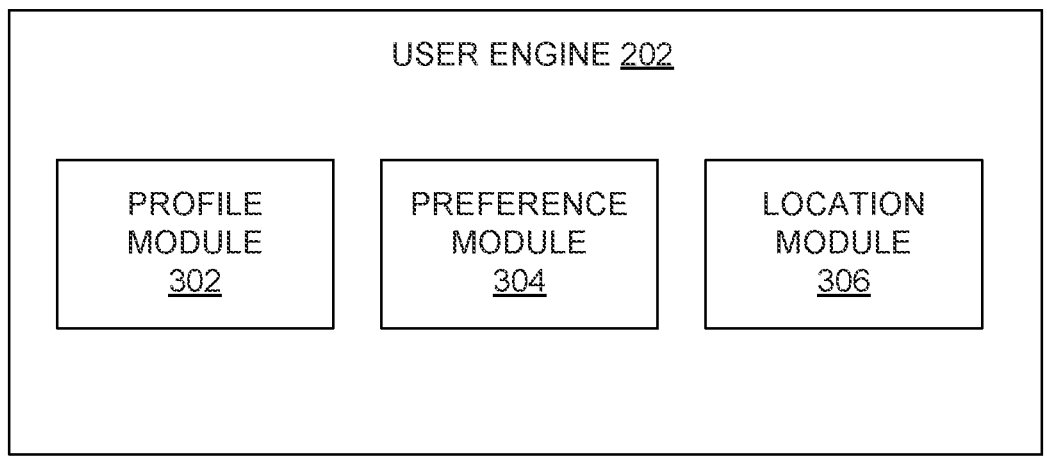
FIG. 3 is a block diagram of an example user engine.

Referring now to FIG. 3, an example block diagram illustrating components that, in one embodiment, are provided within the user engine 202 is shown. The user engine 202 manages operations with respect to users (e.g., consumers) of the marketplace system 120. To enable these operations, the user engine 202 comprises a profile module 302, preference module 304, and a location module 306.

The profile module 302 manages a user profile for each user of the marketplace system 120. In example embodiments, the user creates and maintains an account (e.g., via the use of the shopper application 110) with the marketplace system 120, whereby user information is stored to the user profile. The user profile may include, for example, a user's address, billing information (e.g., credit cards and billing addresses), credit worthiness, income, and financial information (e.g., bank accounts). User profile information may be stored in the databases 126 and be accessed, retrieved, or updated by the profile module 302.

The preference module 304 monitors and analyzes user action to determine affinities for each user. Accordingly, the preference module 304 monitors actions performed by the user via their user device 106. The actions may include, for example, browses and searches for items of interest, purchases made, items saved to a wishlist or watchlist, and items added to a cart but not purchased. These actions may be stored to the database 126 in association with an account or the user profile of the user. In example embodiments, the preference module 304 analyzes the stored actions to determine purchase habits, brand affinities, merchant affinities among other preferences. The preferences are also stored to the database 126 to be used later to provide recommendations to the user.

The location module 306 monitors a user's location via their client device 106. In example embodiments a location device (e.g., global positioning system (GPS) device) in the client device 106 provides location information to the location module 306. The location module 306, in turn, may use or provide the location information to other engines in the marketplace system 120 in order to provide merchant and item results or recommendations that are located within a predetermined distance to the user. The predetermined distance may comprise, for example, a walking distance of the user, a driving distance of the user, and a delivery distance to the user (e.g., continental U.S.).

Figure 4:
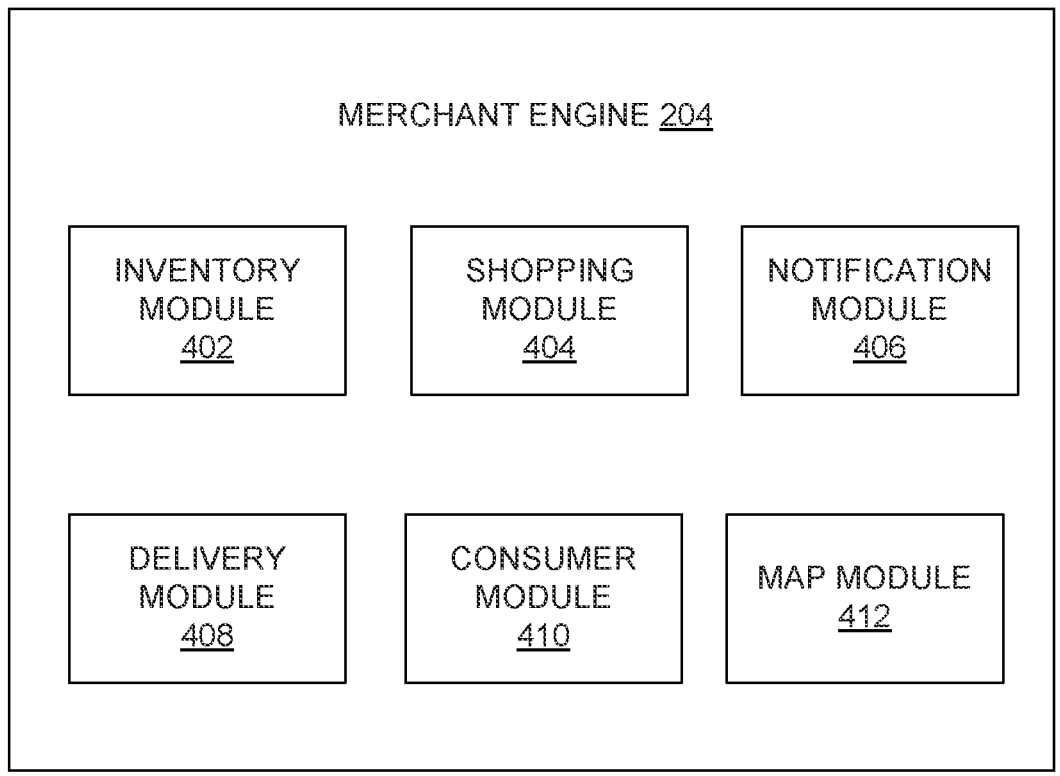
FIG. 4 is a block diagram of an example merchant engine.

Referring now to FIG. 4, an example block diagram illustrating multiple components that, in one embodiment, are provided within the merchant engine 204 is shown. The merchant engine 204 manages item searches, order processing, and delivery among other operations that are associated with merchants. As such, the merchant engine 204 comprises an inventory module 402, a shopping module 404, a notification module 406, a delivery module 408, a consumer module 410, and a map module 412.

The inventory module 402 manages inventory information for each merchant affiliated with the marketplace system 120. In example embodiments, the merchant application 112 shares with the marketplace system 120, or provides access to, inventory information. As a result, the marketplace system 120 is able to maintain a current inventory of available items for each merchant, and can track inventory in each store of a merchant.

The shopping module 404 manages searches by the user for items. Accordingly, the shopping module 404 receives search terms from the client device 106 and performs a search for items that match the search terms. Alternatively, the shopping module 404 receives browse instructions whereby the user navigates through categories and subcategories to reach items of interest. Search or browse results (e.g., information on items of interest) are transmitted back by the shopping module 404 in response to a search or browse request from the client device 106. Search and browse inputs as well as results are also stored to the user preferences.

In some embodiments, the shopping module 404 automatically factors in the user's location, as determined by the location module 306, in determining search results to return to the client device 106. In other embodiments, the user's location triggers the shopping module 404 to provide search results to the user without any request by the user. The marketplace system 120 is aware of items that the user has expressed interest in via the preference module 304 (e.g., via saving to a wishlist, item viewed at an online store, item left in cart, items browsed or searched for in the past). Additionally, the marketplace system 120 is aware of the current location of the user. Accordingly, based on the user being in a particular location, the shopping module 404 can initiate a search for one or more of these items that the user had expressed interest in, and determine whether those items are available near the user. The shopping module 404 may also determine whether to present the item to the user based on whether the item is currently on sale or has a promotion.

For example, if the user was searching for a particular cable on eBay, but did not purchase the cable, and is now in a location that is near an electronic store where the same cable is on sale, the shopping module 404 can transmit item information (e.g., an offer to purchase) to the client device 106 informing the user of the item nearby. Additionally, since the marketplace system 102 is aware of the inventory at a location of the merchant, the shopping module 404 will not provide the item information if the nearby merchant is out of stock on the item. In one embodiment, the shopping module 404 may present the item information in a user interface that allows the user to place an order for the item, and have the item set aside for pickup.

In another example, a general feed of items that may be of interest based on the user's profile and preferences in a location of the user may be provided. The general feed may include information about the area (e.g., user is near a cool shopping district). Additionally, the shopping module 404 can recommend a store that may be interesting to the user based on profile and preference information (e.g., male, likes a particular kind of fashion, follows a particular brand) and surface that store to the user. Deals and sales from merchants in the local area may also be transmitted in the general feed to the user device 106.

The shopping module 404 also maintains a shopping cart where items selected by the user from one or more merchants may be placed until the user completes the transaction with the transaction engine 208. As such, the shopping module 404 receives a selection of the item of interest of interest and places the item in the shopping cart. Because the marketplace system 120 comprises a plurality of affiliated merchants, the shopping module 404 has the ability to maintain a single shopping cart for multiple merchants.

The notification module 406 manages notifications to the merchants of completed orders or transactions. With an order where all items are from a single merchant, the notification module 406 sends a notification to the single merchant to package the items in the order for pickup or delivery. In the case where the order is from two or more merchants, the notification module 406 sends a notification to each of the merchants to package up the items. Additionally, the notification module 406 may indicate a central location to take the packaged items. For example, each merchant may be notified to place their items from an order in a particular locker or to take the items to one of the merchants involved in a multi-merchant order (e.g., a centrally located merchant). The locker may be at a mall or location that is accessible for long periods of time (e.g., 24 hours a day).

Further still, the order may include items that the user would like to try on. For example, the user may select several tops for purchase and indicate two different sizes for a pair of pants. The user pays for the tops and one pair of the pants in order to complete the transaction via the shopper application 110. In turn, the merchant is notified to set aside and hold the two different sized of the pants for the user to try on when the user comes into the store to pick up the tops. The user can then try on the two pairs of pants and take one of the pairs without having to initiate a separate transaction.

The delivery module 408 manages delivery of items that have been ordered. As discussed, the notification to a merchant may indicate a central location that the item(s) in an order should be deposited for pickup. For example, the central location may be a pickup locker. The delivery module 408 may indicate a particular locker to place the item(s). In some cases, the delivery module 408 may also provide an access code to both the merchant and the user (e.g., consumer) that allows access to the particular locker.

In example embodiments, the locker is also used to receive returns. Because the marketplace system 120 facilitates transactions across many merchants and stores purchase histories for these merchants, the marketplace system 120 can manage returns through the locker by use of the purchase histories. For example, the user can browse their purchase history and indicate one or more items they would like to return (e.g., not necessary from the same merchant). Instead of having to go to each individual merchant or store location to return the items, the user can simply place all the items into an assigned locker and indicate, using the shopper application 110 to the delivery module 408 that the items have been placed in the locker. The delivery module 408 then notifies the proper merchants of the return, and the merchant can access the locker to retrieve the items.

The consumer module 410 provides recommendations based on the user profile and affinities. As discussed with respect to the user engine 202, the marketplace system 120 stores information about user including, for example, credit worthiness, income, purchase habits, store affinity, and brand affinity. As the user comes into a store (e.g., checks in with the store or client device 106 is detected in the location of the store), the consumer module 410 can inform store personnel about the presence of the user. For example, an identity of the user along with recommendations for the user may be pushed to a device of an associate at the store. The recommendation may include a particular brand that the user likes that is available at the store (e.g. based on the inventory information maintained by the inventory module 402). In another example, the recommendation may be based on the user having a child that is heading back to school (e.g., determined from user profile information), and may recommend school supplies that are on sale. Alternatively, the recommendations may be pushed to the client device 106 of the user. Further still, if the user is there to pick up an order that they had placed (e.g., via the shopper application 110), the recommendation may include a discount if the user adds the item to their order. Accordingly, the consumer module 410 provides targeted offers that are highly contextual to users in the store.

The map module 412 manages shopping trip planning, and can transmit map information to a user interface of the client device 106. In a local shopping embodiment, the user searches for items in a particular neighborhood or area. When an item of interest is found, the map module 412 places the item (or merchant location of the item) on a map that is transmitted to the user interface of the client device 106. The user may add other items from other merchants, or the consumer module 410 may recommend items from other merchant locations based on proximity and user affinities. The map module 412 may indicate a path to all the items along with distances between the merchant locations and the user's location. The user may remove items or merchant locations (e.g., by selecting and deleting. The map module 412 determines an optimal route or path for the user. However, the user can rearrange the route. In some embodiments, the user can reserve the item(s) via the user interface on the client device 106.

In another embodiment, the map module 412 provides in-store maps based on a search result. For example, the user may access a kiosk in a store or otherwise perform a search for an item within the store using their shopper application 110. The kiosk or shopper application 110 knows the location of the user and thus knows the merchant or store that the user is at. The search module 404 may present a user interface that comprises a questionnaire and based on the answers, an item is recommended. The item may be displayed on a map of the store to the user. In the case of the kiosk, a code (e.g., QR code) may be scanned to upload the map to the client device 106. Alternatively, the user may enter an identifier of the client device 106 (e.g., phone number of the smartphone) on the kiosk, and the map is transmitted to the client device 106 (e.g., text or email).

Figure 5:
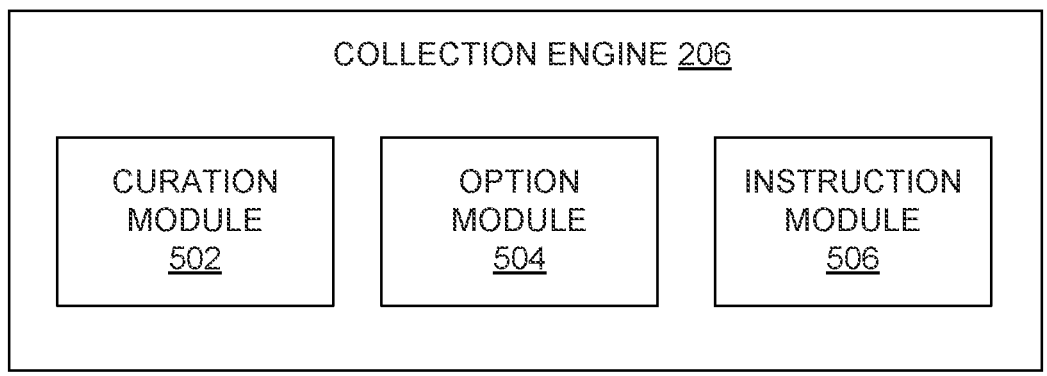
FIG. 5 is a block diagram of an example collection engine

Referring now to FIG. 5, an example block diagram illustrating multiple components that, in one embodiment, are provided within the collection engine 206 is shown. The collection engine 206 manages item collections at the marketplace system 120. An item collection may comprise a plurality of items that are compatible and may be ideal to be purchased together. Accordingly, the collection engine 206 comprises a curation module 502, an option module 504, and an instruction module 506.

The curation module 502 manages organization of items into curated item collections. In some embodiments, the item collection is based on preexisting content such as information licensed from shows (e.g., home improvement shows), material lists for construction, magazine layouts, or publications. The curation module 502 may automatically create item collections by processing material lists into shoppable collections. Further still, a combination of automated and manual process (e.g., via an operator interacting with the curation module 502) may be used to generate the item collections. As a result, the user can shop for a complete project (e.g., item collection) instead of just one item within the project.

The option module 504 manages options that are available for item collections. In example embodiments, the search module 404 may return an item collection based on a search for a particular item in the item collection. The item collection will indicate the searched for item along with other items that go with the search for item for some reason. Some of the items may be required and are selected by default. However, options may be available for other items (e.g., different style, color, material). These options may be determined and presented by the option module 504 to the user interface of the client device 106. The user may then select and deselect different options for the item collection. In some embodiments, the options are determined prior to the search performed by the user (e.g., at the time of curation of the item collection). In other embodiments, the options may be determined at the time of the search (e.g., on-the-fly).

The instruction module 506 manages instructions associated with item collections. In the case where the item collection involves a project, such as a home improvement project, the instruction module 506 provides access to instructions for completing the project. In some cases, the instructions (or access to the instructions) may be provided to the user via a user interface of the client device after the user purchases the item collection.

Although the various components of the marketplace system 120 and its engines have been defined in terms of a variety of individual modules, a skilled artisan will recognize that many of the components can be combined or organized in other ways and that not all modules or engines need to be present or implemented in accordance with example embodiments. Furthermore, not all components of the marketplace system 120 have been included or discussed. In general, components, protocols, structures, and techniques not directly related to functions of exemplary embodiments have not been shown or discussed in detail. The description given herein simply provides a variety of exemplary embodiments to aid the reader in an understanding of the systems and methods used herein.

Figure 6:
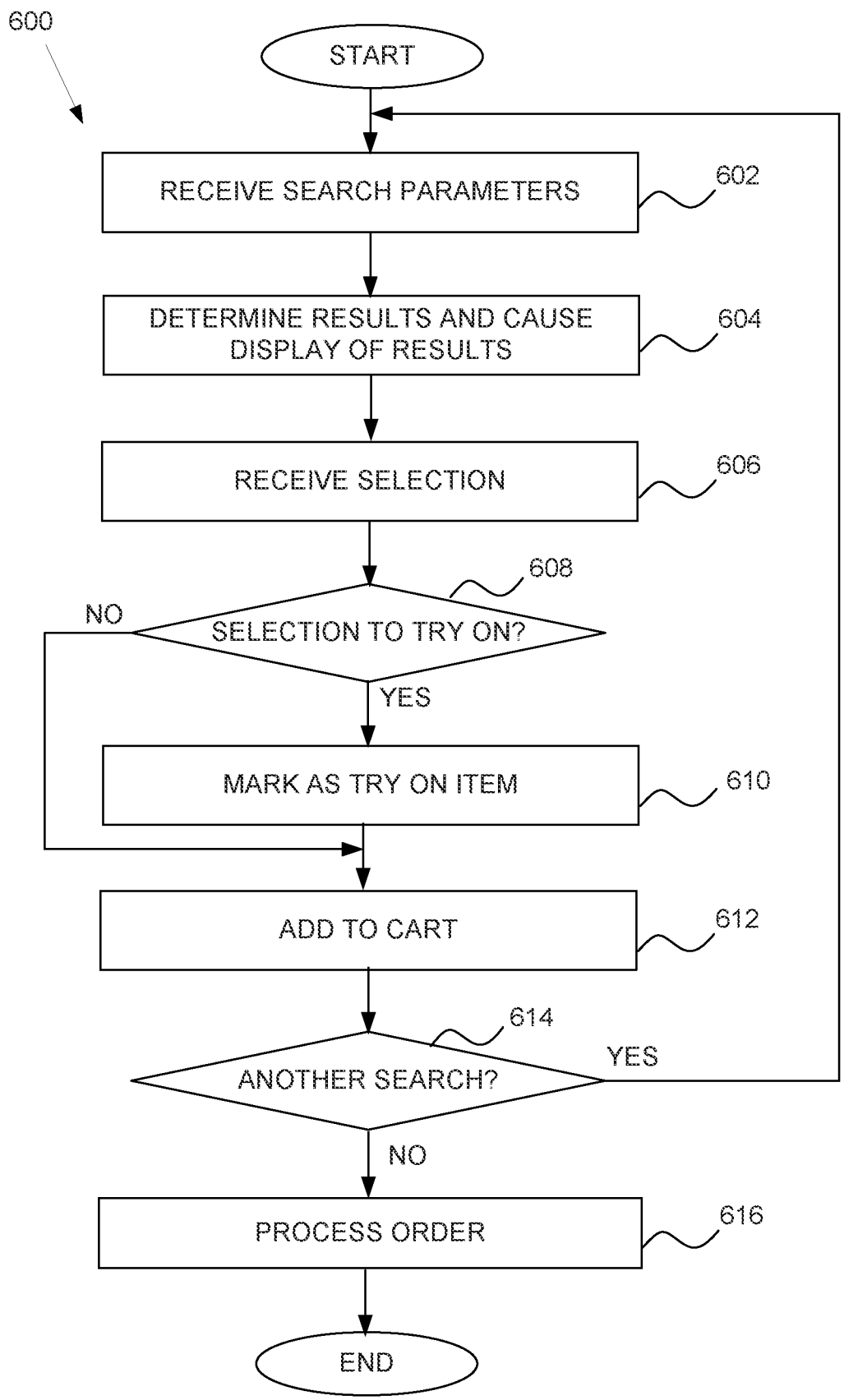
FIG. 6 is a flow diagram of an example method for managing an order at a marketplace system.

FIG. 6 is a flow diagram of an example method 600 for managing an order at a marketplace system. The method 600 allows the user to shop for items using the shopper application 110, select items to try on at a store, and complete the transaction. In operation 602, search parameters are received by the search module 404 from the client device 106. The search parameters may comprise search terms (e.g., keywords) or instructions to browse through categories and sub-categories to items of interest. For example, the user may shop for clothing via the shopper application 110.

In operation 604, results are determined and transmitted to the user device 106 for display on a user interface. Accordingly, the search module 404 performs a search for items that match the search terms or navigates through categories and sub-categories to reach the item of interest. The search or browse results (e.g., listing for the item, product page of the item) are transmitted back by the search module 404 to the client device 106. For example, the user may navigate or be directed to a webpage for an item of clothing based on the search parameters.

In operation 606, a selection of the item of interest is received. Accordingly, the user may decide to purchase, hold, or try on the item and provide an indication or selection of the item. The search module 404 receives the selection.

In operation 608, a determination is made, by the shopping module 404, as to whether the selection includes an indication to try on the selected item. For example, the user may select a pair of pants and indicate two different sizes that the user would like to try on. If the selection includes the indication to try on the item, the selection is marked as a try on item in operation 610, and added to the shopping cart in operation 612. However, if the selection is not a try on item, then the selection may be directly added to the cart in operation 612 after selection in operation 606.

In operation 614, a determination is made as to whether another search and selection is made. For example, after adding the pair of pants to the shopping cart, the user may decide to search for shirts. If another search is determined, then the method 600 returns to operation 602.

However, if the user is finished shopping, then the order is processed in operation 616. Accordingly, the transaction engine 208 processes the order. The processing of the order may include one or more of receiving payment and billing information, indicating a location where the items will be delivered or pick-up from, and providing order confirmation information. In one embodiment, the user pays for the selections marked as try on items. For example, the user pays for one pair of the pants that is marked to be tried on at the merchant location even though two different sizes of the pants are in the shopping cart.

Figure 7:
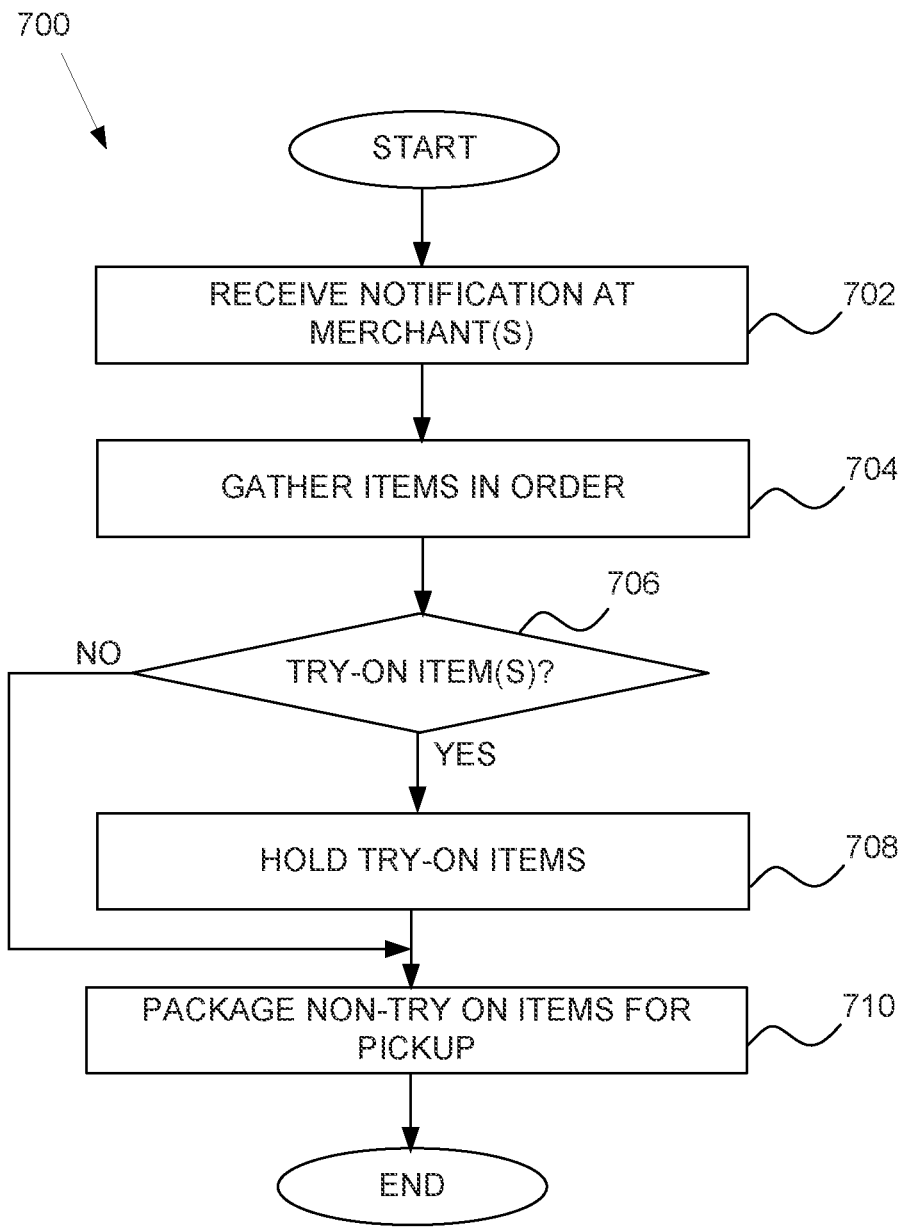
FIG. 7 is a flow diagram of an example method for processing an order at a merchant.

FIG. 7 is a flow diagram of an example method 700 for processing an order at a merchant. In response to the transaction engine 208 processing the order, a notification is sent by the notification module 406 to the merchant(s) having the items in the order to process the order at the merchant location in operation 702. The notification may be received by the merchant application 112 at the merchant system 108.

In response to receiving the notification, the merchant (e.g., an employee of the merchant) gathers the item(s) in the order in operation 704. The merchant determines, in operation 706, whether any of the items are try on items. If there are try on items, the try on items are set aside (e.g., held) for the user in operation 708. For example, the try on items may be placed in a dressing room.

The remainder of the items (e.g., non-try on items) are packaged for pickup in operation 710. In one embodiment, the packaged items may be delivered to a locker for user pickup. In an alternative embodiment, the packaged up items may be delivered to another central location indicated by the order (e.g., a store central to all the merchants involved in a multi-merchant order).

Figure 8:
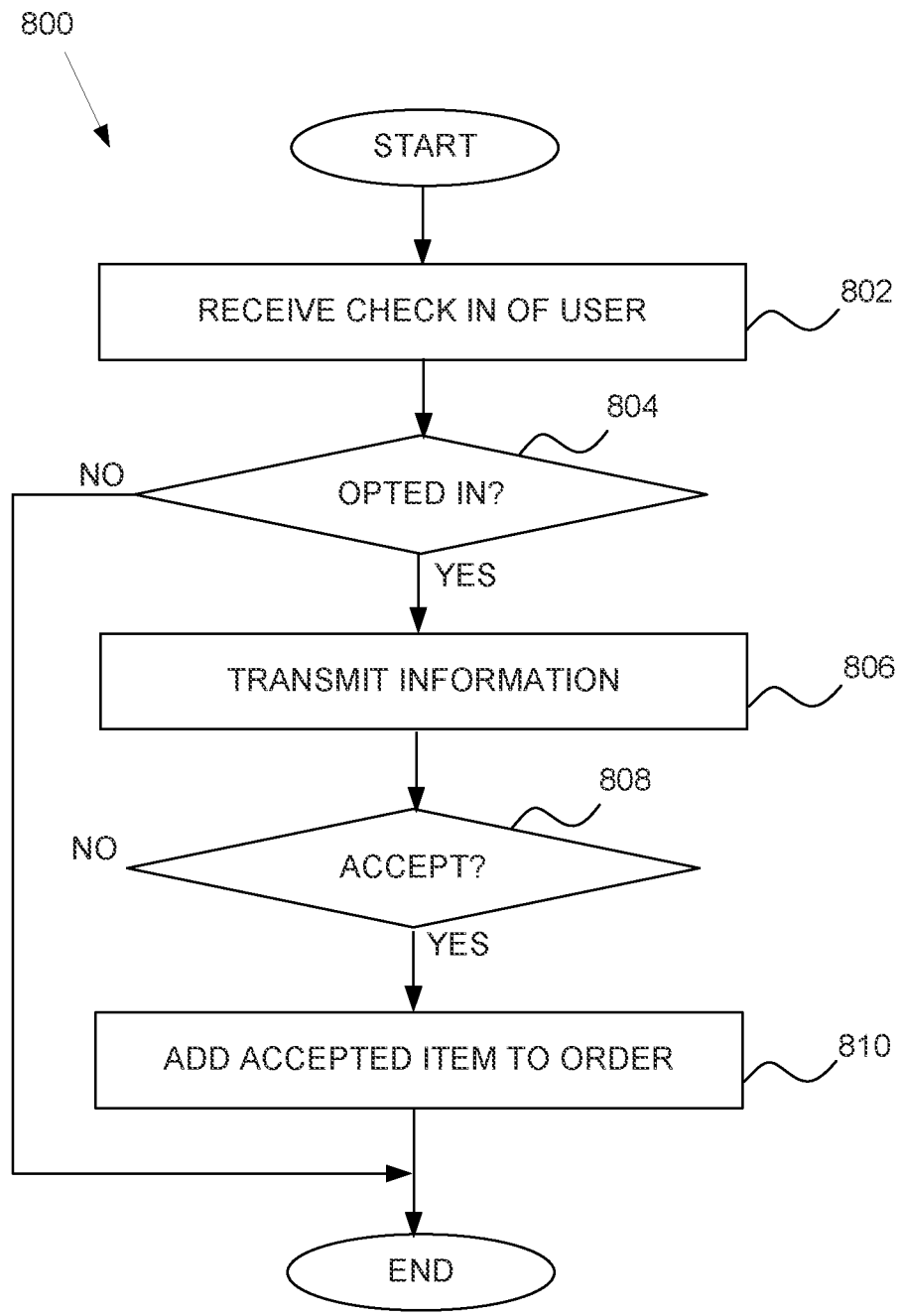
FIG. 8 is a flow diagram of an example method for upselling to a user.

FIG. 8 is a flow diagram of an example method 800 for upselling to a user. The method 800 may occur after the methods 600 and 700. In operation 802, a check-in of the user is received. In example embodiments, the user may manually indicate they are in the area of the merchant (e.g., check-in), or the shopper application 110 on the client device 106 may automatically check-in the user when the user is within a particular distance to the merchant (e.g., determined by GPS). The indication or check-in is received by the location module 306, and notification of the user's presence can be provided by the notification module 408 to the merchant application 112 at the merchant system 108. Ideally, the merchant will have the user's items packaged and any try on items ready for the user to try on.

In operation 804, a determination is made as to whether the user is opted in to receive information from the merchant. Accordingly, the preference module 304 determines whether the user has indicated that they are willing to receiving promotions, sale, or other information from the merchant.

If the user has opted in to receive the information, then the preference module 304 instructs the consumer module 410 to transmit the information in operation 806. As such, the consumer module 410 transmits information (e.g., promotions or recommendations) based on the user profile and user affinities. In one embodiment, the information is transmitted to store personnel. For example, information for the user is transmitted to a device (e.g., tablet that has a version of the merchant application 112) of an associate at the store. Alternatively, the information may be transmitted directly to the client device 106 of the user while the user is in or near the store. The information may include, for example, a recommendation of a particular brand, item, or types of items that the user likes that is available at the store (e.g. based on the inventory information maintained by the inventory module 402). Further still, the information may be related to items that the user has already purchased (e.g., that the user is there to pick up), related to an upcoming event (e.g., back to school), or related to individuals the user normally shops for (e.g., user's children).

In some embodiments, if the user is there to pick up an order that they had placed (e.g., via the shopper application 110), the information may indicate a discount if the user adds the recommended item to their order. Accordingly, the consumer module 410 provides targeted offers that are highly contextual to user while the user is in the store.

A determination is made in operation 808 as to whether the user accepts any offers, promotions, or recommendations. If the user accepts, then the item may be added to their order in operation 810 assuming the user is there to pick up the order. Alternatively, if the user is not at the merchant location to pick up an order, a new order may be created for the user.

Figure 9:
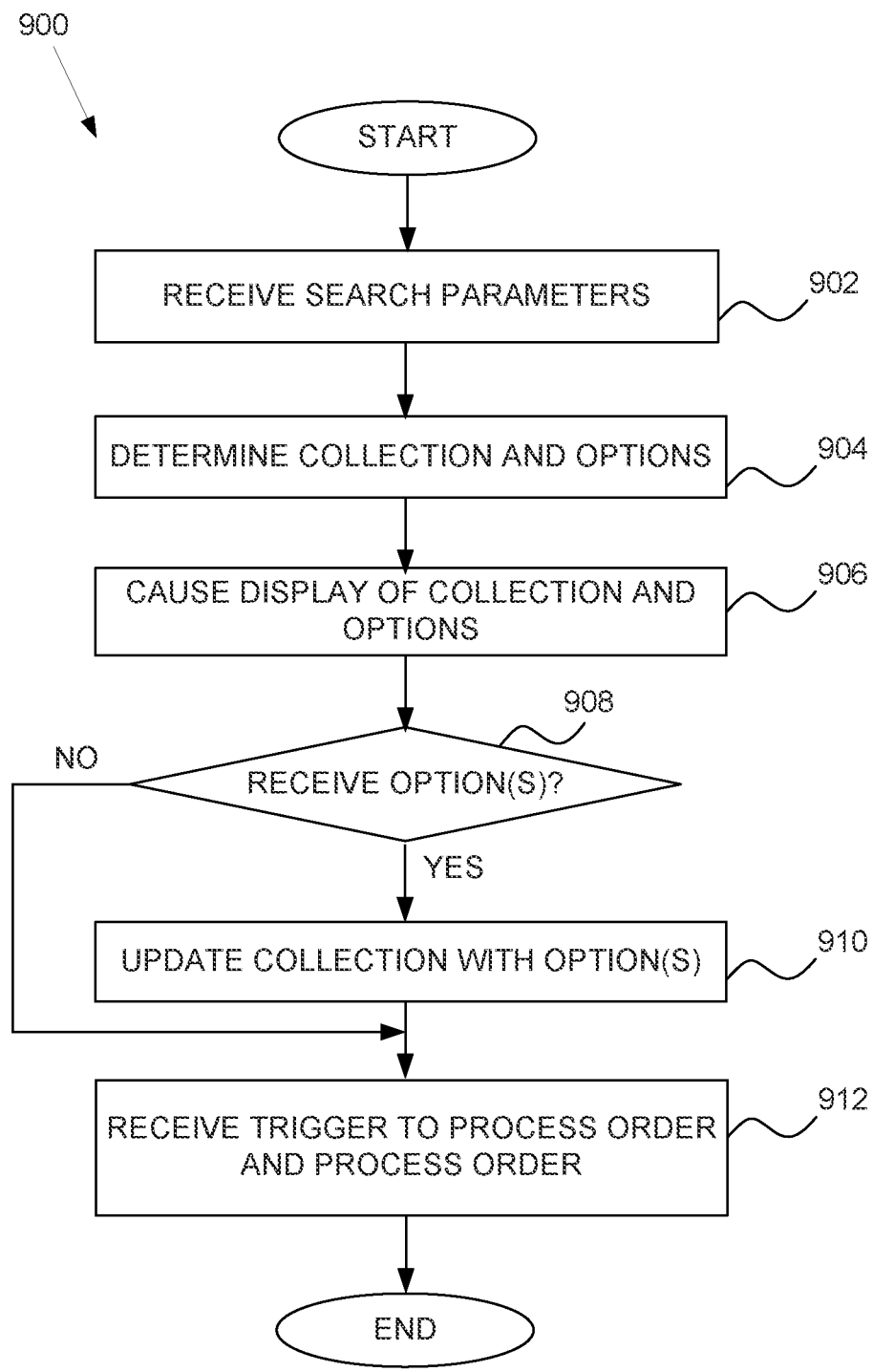
FIG. 9 is a flow diagram of an example method for processing an item collection order.

FIG. 9 is a flow diagram of an example method 900 for processing an item collection order. The various operations of the method 900 may be performed by the merchant engine 204 in association with the collection engine 206. An item collection may comprise a plurality of items that are compatible and may be ideal to be purchased together, especially in order to complete a project. The item collection may also include accessory items that are needed to complete a project, but that may be often forgotten by the user (e.g., tools).

In operation 902, search parameters are received by the shopping module 404. For example, the user may search for a sink and provide search parameters for the sink. Additionally, the user may indicate that they would like to install a new sink as part of a home improvement project.

In operation 904, an item collection and corresponding options are determined. Accordingly, the shopping module 404 determines one or more item collections that contains at least one item that matches the search parameters received from the user. For example, the item collection may include a particular sink that the user indicated with the search parameters. The item collections may also include options for companion items (e.g., different style, color, material) or optional items. For example, options of companion items for the sink may include three different compatible styles or colors of faucets. Optional items may include items that are recommended but not necessary to complete the project. For example, particular tools needed to install a new sink are optional items. If the user already has these particular tools, the user can choose to not purchase these particular tools as part of the item collection.

Thus, in one embodiment, a user interface is presented to the user that illustrates the various items in the item collection along with selection fields (e.g., checkboxes). Items that are required or recommendation may be checked by default (e.g., sink, silicon tape, wrench). The user can uncheck any recommended items (e.g., optional items) that the user does not need (e.g., user already has wrench, so uncheck). Additionally, the user can select between different options for companion items (e.g., select one of the three compatible faucets). A determination is made in operation 908 as to whether selections of options (including optional items) are received. If selections are received, the (default) item collection is updated with the options in operation 910. The user interface can be updated to illustrate the updated item collection (e.g., checkboxes checked and unchecked).

In operation 912, a trigger is received to process the order. Thus, the shopping module 404 may receive the trigger. In some cases, a discount may be given if the user choses to purchase a certain amount of items in the collection (e.g., a bundle deal).

In response, the transaction engine 208 processes the order. In one embodiment, a notification of the order is transmitted to the one or more merchants selling the items so that the merchant(s) can package up the order for pickup by the user (e.g., in store, via a locker, via a central merchant for a plurality of merchants). In an alternative embodiment, the items in the order may be shipped to the user.

In some embodiments, the user is provided access to instructions upon purchase of the item collection. In the case where the item collection involves a project, such as a home improvement project, the instruction module 506 provides access to instructions for completing the project via a user interface of the client device 106. The instructions may include a step-by-step tutorial on how to complete the project. In other embodiments, the user does not need to purchase the item collection in order to view the instructions.

Figure 10:
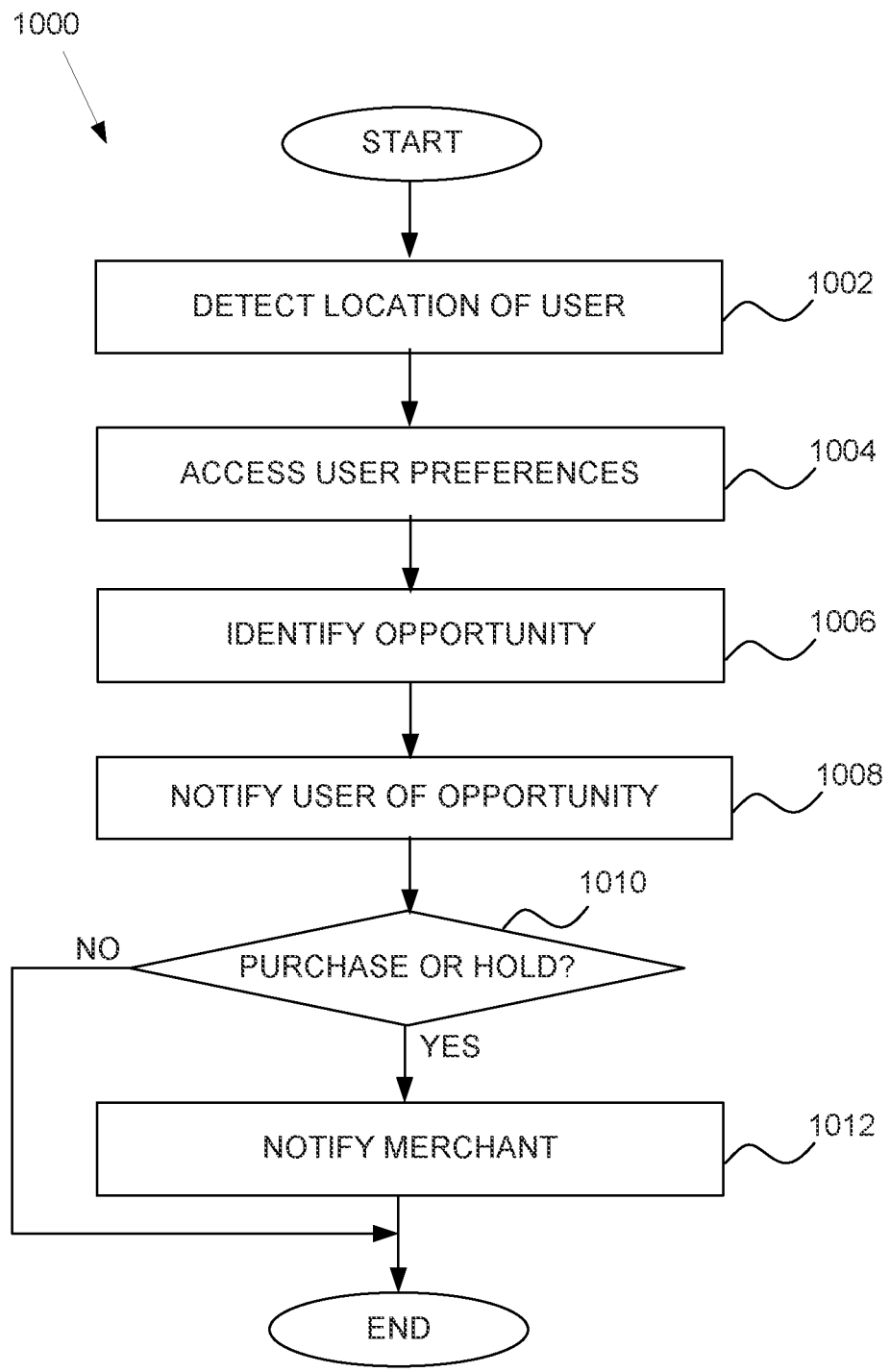
FIG. 10 is a flow diagram of an example method for providing a local shopping opportunity.

FIG. 10 is a flow diagram of an example method 1000 for providing a local shopping opportunity. The method 1000 provides automated shopping opportunities based on a location of the user without any action by the user. In operation 1002, a location of the user is detected. For example, a GPS device in the client device 106 may provide location information to the location module 306.

User affinities are accessed in operation 1004. Accordingly, the preference module 304 accesses user preference information from the database 126. The user affinities are based on actions performed by the user such as browses and searches for items of interest, purchases made, items saved to a wishlist or watchlist, and items added to a cart but not purchased.

Shopping opportunities are identified in operation 1006. Based on the location of the user, user affinities, and inventory for merchants in the same location, the shopping module 404 in conjunction with the consumer module 410 initiates a search for one or more of items that the user had expressed interest in, and determine whether those items are available at one of the local merchants within a predetermined distance to the location of the user. The predetermined distance may be a default distance or be set by the user.

In operation 1008, the user is notified about the shopping opportunity. For example, if the user was searching for a particular item online, but did not purchase the item, and is now in a location within a predetermined distance to a nearby store that sells the same item, the shopping module 404 or consumer module 410 can transmit (or cause to be transmitted) a notification of the shopping opportunity (e.g., item information and an offer to purchase) to the client device 106. The notification may include price, promotions, inventory, location of the item, and distance to the merchant location. A map may also be provided to illustrate a path to the merchant location or item location.

In operation 1010, a determination is made as to whether an indication to purchase or hold the item is received from the user device 106. For example, the item information is presented in an order interface on the client device 106 that allows the user to place an order for the item or have the item set aside for pickup. The indication is received by the shopping module 404, and an order may be processed by the transaction engine 208.

If the user selected to purchase or hold the item, the merchant is notified in operation 1012. Accordingly, the notification module 406 transmits a notification to the merchant instructing the merchant to package the item up for pickup or to set the item aside as a hold or try on item.

Figure 11:
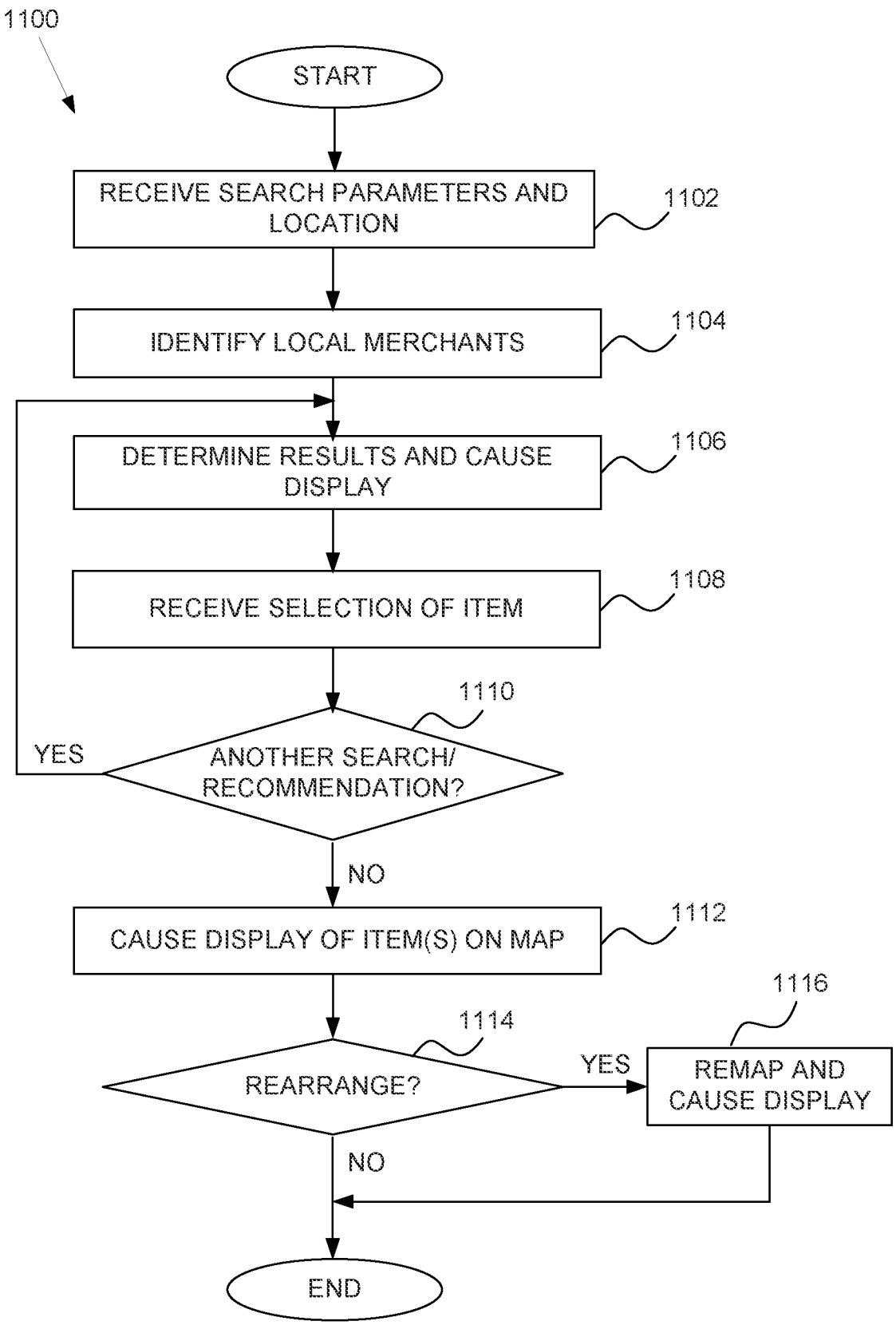
FIG. 11 is a flow diagram of an example method for providing shopping trip planning.

FIG. 11 is a flow diagram of an example method 1100 for providing shopping trip planning. The method 1100 allows the user, via user interfaces provided to their client device 106, to plan a shopping trip for one or more items. In operation 1102, search parameters and a location of interest is received by the shopping module 404. For example, the user may be interested in shopping a particular neighborhood, and may indicate that interested to the shopping module 404. Alternatively, the location module 306 may detect a location that the user is currently at.

In operation 1104, local merchants within a predetermined distance to the user location (or user indicated location of interest) are identified by the shopping application 1104. The local merchants are merchants affiliated with the marketplace system 120 and have agreed to share information such as inventory with the marketplace system 120.

The shopping module 404 then determines results that match the search parameters. The results include items from the local merchants identified in operation 1104 that are currently available based on the inventory information shared with the marketplace system 120. The results are caused to be displayed on a user interface to the client device 106 (via the shopper application 110). The user interface may present the items along with a merchant location. In one embodiment, the items or merchant location are shown on a map on the user interface.

Based on the user selecting an item from the result, the selection is received in operation 1108 by the shopping module 404. In response, the shopping module 404 may cause the map module 412 to place the item (or merchant location of the item) on a shopping trip planning map that will be transmitted to the user interface of the client device 106.

A determination is made in operation 1110 as to whether another search is performed or a recommendation to be presented. In some embodiments, the shopper module 404 or consumer module 410 may provide recommendations based on user affinities or provide recommendations related to the selected item from operation 1108 (e.g., an accessory or companion item). If another search is performed or a recommendation to be presented, the method 1110 returns to operation 1106. The shopping trip planning map may be continually updated with new selections and as the user device 106 changes location (e.g., as the user of the user device walks along a route on the shopping trip planning map).

Once the user has completed the search for items, the shopping trip planning map showing all selected items is caused to be presented on the client device 106 in operation 1112. The shopping trip planning map may indicate a path to view or pick up all the items along with distances between the merchant locations and the user's location. In example embodiments, the map module 412 determines an optimal route or path for the user (e.g., based on distance, store hours, limited inventory), which the user can rearrange.

In operation 1114, a determination is made as to whether the user rearranges the route. The user may remove items or merchant locations (e.g., by selecting and deleting nodes on the map representing the locations). The user may also move various nodes representing the locations to change a sequence of the route (e.g., go to Merchant B before Merchant A). If the user does rearrange the route, the map is updated and updated map is caused to be displayed in operation 1116.

Figure 12:
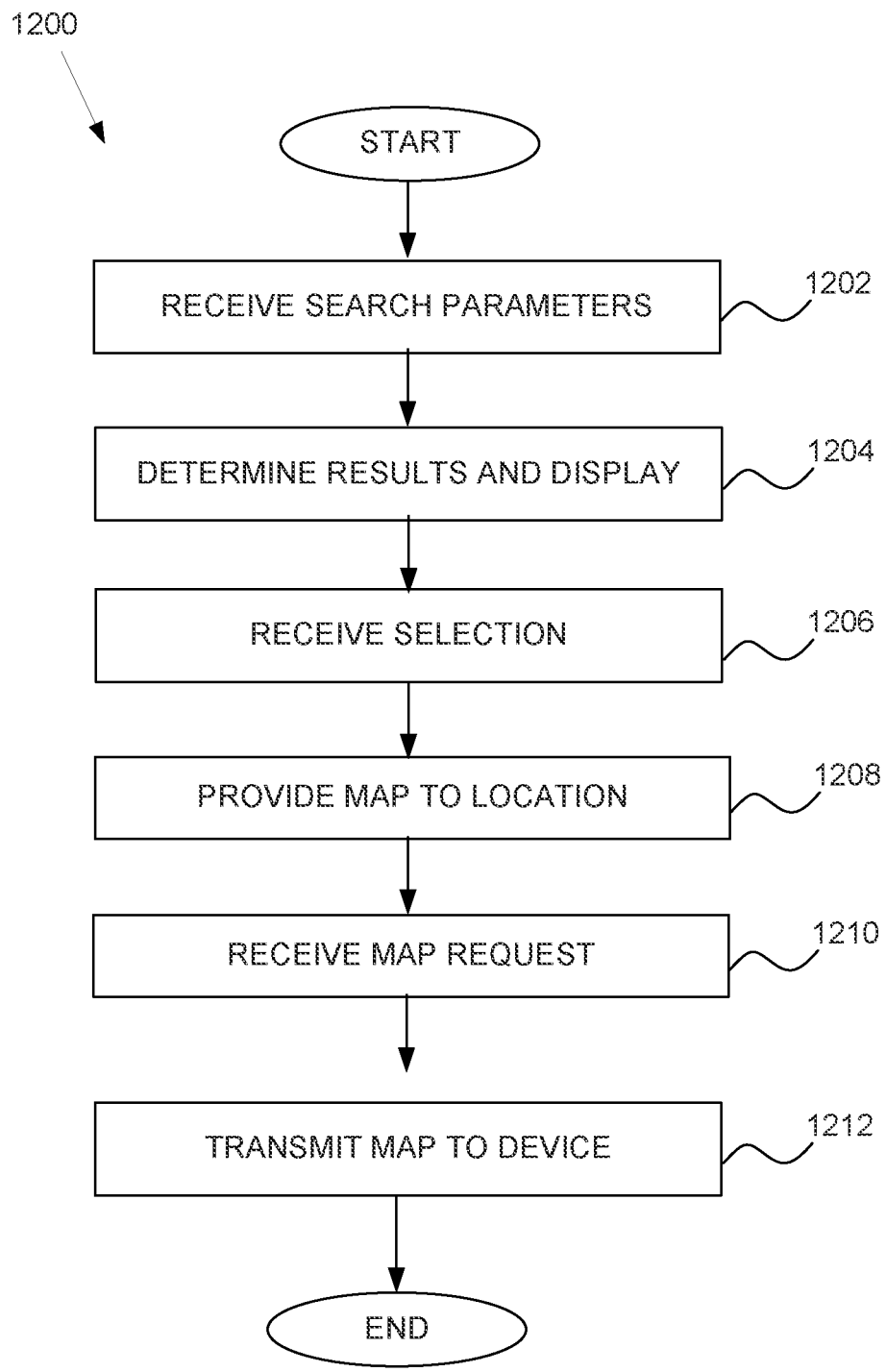
FIG. 12 is a flow diagram of an example method for providing shopping planning at a kiosk.

FIG. 12 is a flow diagram of an example 1200 method for providing shopping planning at a kiosk. The kiosk may comprise or be a part of the merchant system 108 or be a part of the marketplace place system 120. Accordingly, the kiosk may include the merchant application 112 or one or more of the engines or modules of the marketplace system 120. The kiosk may be located at a location of a particular merchant affiliated with the marketplace system 120, and may be item or gift finder kiosk.

In some embodiments, the kiosk may be equipped with a camera to detect one or more individuals accessing the kiosk. If the kiosk detects that the individual is a child, the merchant application 112 may provide a game or other interface for the child. However, if the kiosk detects an adult, the kiosk may present a search interface that allows the adult user to find an item.

In operation 1202, search parameters are received. The search parameters may be provided, for example, via a touchscreen on the kiosk. In one embodiment, the shopping module 404 may cause presentation of the search interface on the kiosk that comprises a questionnaire (e.g., gender, age, price range). The user provides answers to the questionnaire which, in turn, are the search parameters.

In operation 1204, results are determined and caused to be displayed to the user. Accordingly, the shopping module 202 takes the location of the user (e.g., the store the user is in) along with the search parameters and determine available inventory in the store that match the search parameters. The results are then presented on the screen of the kiosk.

A selection of an item from the results is received in operation 1206. For example, the user may select, via the touchscreen, an item that the user wants to buy. In response, an in-store map of a location of the item is displayed on the kiosk by the map module 412 in operation 1208.

The user may desire to have the map and item location uploaded to their client device 106. As such, the user requests the map in operation 1210. For example, a code (e.g., QR code) may be displayed on the kiosk, and the user scans the code to upload the map to the client device 106. Alternatively, the user may enter an identifier of the client device 106 (e.g., phone number of the smartphone) into the kiosk.

In operation 1212, the map is transmitted to the client device 106. In the case where the user provides an identifier of the client device 106, the map may be sent, for example, via text or e-mail to the client device 106.

According to various example embodiments, one or more of the methodologies described herein may facilitate completion of a transaction for an item based on known merchant inventory, user affinities, and location of the user. As such, one or more of the methodologies described herein may obviate a need for certain efforts or resources that otherwise would be involved in searching for items. Computing resources used by one or more machines, databases, or devices (e.g., within the network environment 100) may be reduced. Examples of such computing resources include processor cycles, network traffic, memory usage, data storage capacity, power consumption, and cooling capacity.

Figure 13:
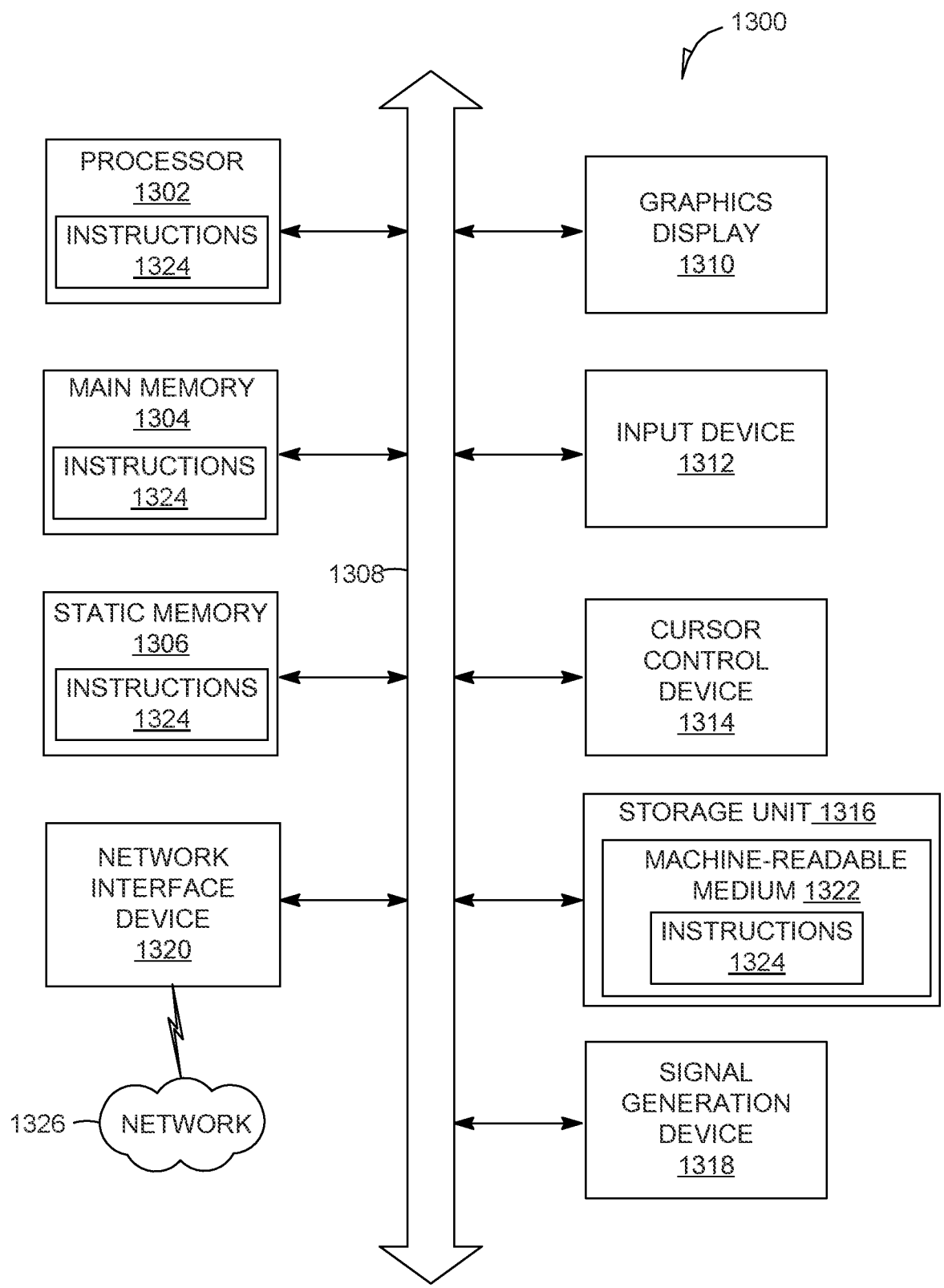
FIG. 13 is a simplified block diagram of a machine in an example form of a computing system within which a set of instructions for causing the machine to perform any one or more of the methodologies discussed herein may be executed.

FIG. 13 is a block diagram illustrating components of a machine 1300, according to some example embodiments, able to read instructions 1324 from a machine-readable medium 1322 (e.g., a non-transitory machine-readable medium, a machine-readable storage medium, a computer-readable storage medium, or any suitable combination thereof) and perform any one or more of the methodologies discussed herein, in whole or in part. Specifically, FIG. 13 shows the machine 1300 in the example form of a computer system (e.g., a computer) within which the instructions 1324 (e.g., software, a program, an application, an applet, an app, or other executable code) for causing the machine 1300 to perform any one or more of the methodologies discussed herein may be executed, in whole or in part.

In alternative embodiments, the machine 1300 operates as a standalone device or may be connected (e.g., networked) to other machines. In a networked deployment, the machine 1300 may operate in the capacity of a server machine or a client machine in a server-client network environment, or as a peer machine in a peer-to-peer (or distributed) network environment. The machine 1300 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1324, sequentially or otherwise, that specify actions to be taken by that machine. Further, while only a single machine is illustrated, the term "machine" shall also be taken to include a collection of machines that individually or jointly execute the instructions 1324 to perform any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The processor 1302 may contain microcircuits that are configurable, temporarily or permanently, by some or all of the instructions 1324 such that the processor 1302 is configurable to perform any one or more of the methodologies described herein, in whole or in part. For example, a set of one or more microcircuits of the processor 1302 may be configurable to execute one or more modules (e.g., software modules) described herein.

The machine 1300 may further include a graphics display 1310 (e.g., a plasma display panel (PDP), a light emitting diode (LED) display, a liquid crystal display (LCD), a projector, a cathode ray tube (CRT), or any other display capable of displaying graphics or video). The machine 1300 may also include an input device 1312 (e.g., a keyboard or keypad), a cursor control device 1314 (e.g., a mouse, a touchpad, a trackball, a joystick, a motion sensor, an eye tracking device, or other pointing instrument), a storage unit 1316, a signal generation device 1318 (e.g., a sound card, an amplifier, a speaker, a headphone jack, or any suitable combination thereof), and a network interface device 1320.

The storage unit 1316 includes the machine-readable medium 1322 (e.g., a tangible and non-transitory machine-readable storage medium) on which are stored the instructions 1324 embodying any one or more of the methodologies or functions described herein. The instructions 1324 may also reside, completely or at least partially, within the main memory 1304, within the processor 1302 (e.g., within the processor's cache memory), or both, before or during execution thereof by the machine 1300. Accordingly, the main memory 1304 and the processor 1302 may be considered machine-readable media (e.g., tangible and non-transitory machine-readable media).

In some example embodiments, the machine 1300 may be a portable computing device, such as a smart phone or tablet computer, and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1300), such that the instructions, when executed by one or more processors of the machine (e.g., processor 1302), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1324 may further be transmitted or received over a communications network 1326 using a transmission medium via the network interface device 1320 and utilizing any one of a number of well-known transfer protocols (e.g., HTTP). Examples of communication networks include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
   a kiosk comprising:
   a user input mechanism to receive a search parameter from a user;
   a display for presenting results of a search based on the search parameter; and
   a memory storing instructions that, when executed by one or more processors, cause the one or more processors to perform operations comprising:
      determining the results based on the search parameter;
      in response to determining the results, generating and displaying a map associated with the results along with a QR code on the display of the kiosk, the QR code being scannable by a mobile device of the user to upload the map associated with the results; and
      in response to receiving a map request generated by the mobile device scanning the QR code on the display of the kiosk, electronically transmitting the map to the mobile device associated with the user.

2. The system of claim 1, wherein the user input mechanism and the display comprise a touchscreen on the kiosk.

3. The system of claim 1, wherein the results are based on a location of the user that is detected by a location module.

4. The system of claim 3, wherein the results comprise available inventory in an area associated with the location.

5. The system of claim 1, the operations further comprise:
   displaying the results on the display; and
   receiving a selection of one of the results presented on the display, wherein the displaying the map associated with the results comprises displaying a map of a location of the selection on the display.

6. The system of claim 5, wherein:
   the one of the results comprises an item; and
   displaying the map of the location comprises displaying an in-store map of the location of the item.

7. The system of claim 1, wherein the operations further comprise:
   receiving an indication of a selection and deletion of a node of a route shown on the map; and
   based on the indication, updating the map to cause a change to the route.

8. The system of claim 1, wherein the operations further comprise:
   receiving an indication of a selection and movement of at least one node of a route shown on the map; and
   based on the indication, updating the map to cause a change to the route.

9. The system of claim 1, further comprising an image capture device and wherein the operations further comprise:
   detecting, by the image capture device, that the user is an adult; and
   based on the user being an adult, presenting a search user interface via which the search parameter is received.

10. The system of claim 1, further comprising an image capture device and wherein the operations further comprise:
    detecting, by the image capture device, that the user is a child; and
    based on the user being a child, presenting a non-search user interface to the child, the non-search user interface including a gaming interface.

11. A method comprising:
    receiving, at a kiosk, a search parameter from a user;
    determining, by one or more processors of the kiosk, results based on the search parameter;
    in response to determining the results, generating and displaying a map associated with the results along with a QR code on a display of the kiosk, the QR code being scannable by a mobile device of the user to upload the map associated with the results; and
    in response to receiving a map request generated by the mobile device scanning the QR code on the display of the kiosk, electronically transmitting the map to the mobile device associated with the user.

12. The method of claim 11, wherein the display comprises a touchscreen on the kiosk through which the search parameter is received.

13. The method of claim 11, wherein the results are based on a location of the user that is detected by a location module.

14. The method of claim 11, further comprising:
    displaying the results on the display;
    receiving a selection of one of the results presented on the display, wherein the displaying the map associated with the results comprises displaying a map of a location of the selection on the display.

15. The method of claim 14, wherein:
    the one of the results comprises an item; and
    displaying the map of the location comprises displaying an in-store map of the location of the item.

16. The method of claim 11, further comprising:
    receiving an indication of a selection and deletion of a node of a route shown on the map; and
    based on the indication, updating the map to cause a change to the route.

17. The method of claim 11, further comprising:
    receiving an indication of a selection and movement of at least one node of a route shown on the map; and
    based on the indication, updating the map to cause a change to the route.

18. The method of claim 11, further comprising:
    detecting, by an image capture device, that the user is an adult; and
    based on the user being an adult, presenting a search user interface via which the search parameter is received.

19. The method of claim 11, further comprising:
    detecting, by an image capture device, that the user is a child; and
    based on the user being a child, presenting a non-search user interface to the child, the non-search user interface including a gaming interface.

20. A non-transitory machine-storage medium storing instructions that, when executed by one or more hardware processors of a machine, cause the machine to perform operations comprising:
    receiving a search parameter from a user;
    determining results based on the search parameter;
    in response to determining the results, generating and displaying a map associated with the results along with a QR code on the display of the kiosk, the QR code being scannable by a mobile device of the user to upload the map associated with the results; and in response to receiving a map request generated by the mobile device scanning the QR code on the display of the kiosk, electronically transmitting the map to the mobile device associated with the user.

\* \* \* \* \*